US011240103B2

(12) United States Patent
Chi et al.

(10) Patent No.: US 11,240,103 B2
(45) Date of Patent: Feb. 1, 2022

(54) NETWORK PARAMETER OPTIMIZATION METHOD AND APPARATUS

(71) Applicant: HUAWEI TECHNOLOGIES CO., LTD., Shenzhen (CN)

(72) Inventors: Qinghua Chi, Shanghai (CN); Yuanyuan Wang, Shanghai (CN); Yan Wang, Shanghai (CN); Wei Zhou, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/985,405

(22) Filed: Aug. 5, 2020

(65) Prior Publication Data

US 2020/0366557 A1 Nov. 19, 2020

Related U.S. Application Data

(63) Continuation of application No. PCT/CN2019/072708, filed on Jan. 22, 2019.

(30) Foreign Application Priority Data

Feb. 9, 2018 (CN) .......................... 201810135977.2

(51) Int. Cl.
H04L 12/24 (2006.01)
H04W 24/06 (2009.01)

(52) U.S. Cl.
CPC ........ *H04L 41/0823* (2013.01); *H04L 41/145* (2013.01); *H04W 24/06* (2013.01)

(58) Field of Classification Search
USPC ....................................................... 709/220
See application file for complete search history.

(56) References Cited

U.S. PATENT DOCUMENTS 6,058,260 A 5/2000 Brockel et al.
8,745,211 B2 * 6/2014 Marquezan ............. H04L 47/70
709/224

(Continued)

FOREIGN PATENT DOCUMENTS

CN 101237697 A 8/2008
CN 102045734 A 5/2011
(Continued)

OTHER PUBLICATIONS

Zhiyong Feng et al., Reinforcement Learning Based Dynamic Network Self-Optimization for Heterogeneous Networks, 2009 IEEE Pacific Rim Conference on Communications, Computers and Signal Processing, Oct. 23, 2009, 6 pages.

*Primary Examiner* — Hermon Asres
(74) *Attorney, Agent, or Firm* — Maier & Maier, PLLC

(57) ABSTRACT

An embodiment provides a network parameter optimization method and apparatus, to implement online network parameter optimization. The method includes: sending, by a first function entity, an evaluation model to a second function entity, where the evaluation model is used by the second function entity to determine a first network parameter adjustment action performed by a network element in a first network environment state; receiving, by the first function entity, information about the first network parameter adjustment action; updating, by the first function entity, the evaluation model based on information about the first network environment state, the information about the first network parameter adjustment action, information about a return obtained after the network element performs the first network parameter adjustment action, and information about a second network environment state after the network element performs the first network parameter adjustment action.

15 Claims, 13 Drawing Sheets

(56) References Cited

U.S. PATENT DOCUMENTS

| | | | |
|---|---|---|---|
| 8,830,873 B2* | 9/2014 | Tomic | H04L 49/356 |
| | | | 370/255 |
| 2016/0162783 A1 | 6/2016 | Technologies | |
| 2020/0366557 A1* | 11/2020 | Chi | H04L 41/145 |
| 2020/0374711 A1* | 11/2020 | Honkasalo | H04W 16/22 |

FOREIGN PATENT DOCUMENTS

| | | |
|---|---|---|
| CN | 104158700 A | 11/2014 |
| CN | 107209872 A | 9/2017 |
| CN | 107211294 A | 9/2017 |
| EP | 3046289 A1 | 7/2016 |
| EP | 3 136 650 A1 | 3/2017 |
| WO | 2016/029483 A1 | 3/2016 |

* cited by examiner

NETWORK PARAMETER OPTIMIZATION METHOD AND APPARATUS

CROSS-REFERENCE TO RELATED APPLICATIONS

This application is a continuation of International Application No. PCT/CN2019/072708, filed on Jan. 22, 2019, which claims priority to Chinese Patent Application No. 201810135977.2, filed on Feb. 9, 2018. The disclosures of the aforementioned applications are hereby incorporated by reference in their entireties.

TECHNICAL FIELD

Embodiments relate to the field of communications technologies, and in particular, to a network parameter optimization method and apparatus.

BACKGROUND

A purpose of radio resource management (RRM) is to properly allocate and effectively manage limited radio resources in a mobile communications system, so that performance and a capacity of the system reach a joint optimal state. By flexibly allocating and dynamically adjusting available resources of a wireless transmission network when network traffic is unevenly distributed, the channel characteristic fluctuates due to channel fading and interference, and so the radio resource management aims at maximizing spectrum utilization and the system capacity while quality of service of the network is ensured. The radio resources mainly include time, frequency, and power. Functions of the RRM are implemented based on allocation and adjustment of the radio resources, and the allocation and the adjustment of the radio resources mainly include resource allocation, admission control, load balancing, and the like.

Many parameters used for the RRM of a mobile communications system use default configurations. For example, the foregoing parameters may be: pilot power, reference signal power, an antenna downtilt, a long term evolution (LTE) reusable level difference threshold, and a measurement report interference decision threshold. However, the parameters that use the default configurations cannot adapt to movement of a terminal and a change of a traffic mode, and the parameters that use the default configurations are usually not optimal for all cells. Consequently, network efficiency cannot be maximized. The pilot power is used as an example. The pilot power is a part of downlink power, and the downlink power also includes power of another downlink channel. When transmitter power is specified, if the pilot power that uses a default configuration takes a relatively large proportion, the power of the other downlink channel takes a relatively small proportion, and a traffic volume supported by the another downlink channel decreases; if the pilot power that uses the default configuration takes a relatively small proportion, a range of a cell served by a pilot signal decreases. Consequently, the pilot power that uses the default configuration cannot maximize the network efficiency.

SUMMARY

Embodiments provide a network parameter optimization method and apparatus, to implement online network parameter optimization.

Exemplary technical solutions provided in the embodiments are as follows:

According to a first aspect, a network parameter optimization method is provided. Through interaction with another function entity, a first function entity implements network parameter optimization by using a reinforcement learning method. A network parameter adjustment action is sent to a network element that performs the action, an evaluation model is iteratively updated based on a change of a network environment status after the network element performs the network parameter adjustment action and a return obtained after the network element performs the network parameter adjustment action, and a next network parameter adjustment action is determined by using an evaluation model obtained after update.

In a possible embodiment, the first function entity sends an evaluation model to a second function entity, where the evaluation model is used by the second function entity to determine a first network parameter adjustment action performed by the network element in a first network environment state; the first function entity receives information about the first network parameter adjustment action; the first function entity updates the evaluation model based on information about the first network environment state, the information about the first network parameter adjustment action, information about a return obtained after the network element performs the first network parameter adjustment action, and information about a second network environment state after the network element performs the first network parameter adjustment action; and the first function entity sends an evaluation model obtained after update to the second function entity, where the evaluation model obtained after the update is used by the second function entity to determine a second network parameter adjustment action performed by the network element in the second network environment state. Therefore, the reinforcement learning method is applied to a network parameter optimization process.

In a possible embodiment, before updating the evaluation model, the first function entity receives configuration information of a rule. The rule includes at least one of the following: a type and/or a calculation method of a network environment status, a range and a step of a network parameter adjustment action, and a type and/or a calculation method of a return; the first function entity obtains, based on the rule, network data of this type of network environment status and of this type of return from a third function entity; and the first function entity determines, based on the network data, the information about the return obtained after the network element performs the first network parameter adjustment action and the information about the second network environment state. In this way, by setting an interface on the first function entity to receive the configuration information of the rule, a parameter definition or an algorithm of reinforcement learning is flexibly orchestrated, so that data required for training or updating the evaluation model is more abundant and has diversity and applicability, and the rule can be orchestrated based on a network requirement. The rule is the parameter definition or the algorithm of the reinforcement learning.

In a possible embodiment, if the first function entity is an analysis and modeling function (AMF) entity, and the second function entity is a model execution function (MEF) entity, that the first function entity sends the evaluation model to the second function entity may be understood as: The AMF entity sends the evaluation model to the MEF entity, so that the MEF entity determines, based on the evaluation model, the first network parameter adjustment action that is before adjustment and delivers, to an adaptive policy function (APF) entity, the first network parameter adjustment action that is before the adjustment, where the first network parameter adjustment action that is before the adjustment is determined by the MEF entity based on the evaluation model; and the APF entity determines, based on a policy, whether the received first network parameter adjustment action sent by the MEF entity needs to be adjusted, and if the first network parameter adjustment action does not need to be adjusted, the APF entity delivers, to the network element, the first network parameter adjustment action received from the MEF entity; or if the first network parameter adjustment action needs to be adjusted, the APF entity delivers, to the network element, a first network parameter adjustment action obtained after the adjustment; and that the first function entity receives the information about the first network parameter adjustment action may be understood as: The AMF entity receives information about the first network parameter adjustment action that is obtained after the adjustment and sent by the APF entity, where the first network parameter adjustment action obtained after the adjustment is actually a first network parameter adjustment action determined by the APF entity based on the policy; and the first network parameter adjustment action obtained after the adjustment includes an action that is actually adjusted and that is different from the originally received first network parameter adjustment action sent by the MEF entity, or may include an action that is not adjusted and that is the same as the originally received first network parameter adjustment action sent by the MEF entity. In this way, through interaction between the AMF entity and the MEF entity, and further through interaction between the MEF entity and the APF entity and interaction between the APF entity and the network element, the reinforcement learning method can be applied to the network parameter optimization process.

In a possible embodiment, if the first function entity is an AMF entity, and the second function entity is an MEF entity, the first function entity updates the evaluation model based on the information about the first network environment state, the information about the first network parameter adjustment action obtained after the adjustment, information about a return obtained after the network element performs the first network parameter adjustment action obtained after the adjustment, and information about a second network environment state after the network element performs the first network parameter adjustment action obtained after the adjustment.

In a possible embodiment, the AMF entity sends, to the MEF entity, a key performance indicator (KPI) type and a KPI assurance threshold of each KPI type, and the KPI type and the KPI assurance threshold of each KPI type are used for the following operations: The MEF entity determines whether a specific value of a KPI of each KPI type violates a KPI assurance rule and sends a determining result to the APF entity, and the APF entity performs a rollback operation when a specific value of a KPI of any KPI type violates the KPI assurance rule. An action after the rollback operation is used as the first network parameter adjustment action obtained after the adjustment, and the KPI assurance rule is that the specific value is not greater than or not less than the KPI assurance threshold. In this way, it can ensure that KPI deterioration does not occur in the network parameter optimization process implemented by using the reinforcement learning method.

In a possible embodiment, if the first function entity is an AMF entity, and the second function entity is an APF entity, that the first function entity sends the evaluation model to the second function entity, and the first function entity receives the information about the first network parameter adjustment action may be understood as: The AMF entity sends the evaluation model to the APF entity, so that the APF entity determines the first network parameter adjustment action based on the evaluation model, and the AMF entity receives the information about the first network parameter adjustment action sent by the APF entity. In this way, through interaction between the AMF entity and the APF entity and interaction between the APF entity and the network element, the reinforcement learning method can be applied to the network parameter optimization process.

In a possible embodiment, the AMF entity further sends, to the APF entity, a KPI type and a KPI assurance threshold of each KPI type, and the KPI type and the KPI assurance threshold of each KPI type are used for the following operations: The APF entity determines whether a specific value of a KPI of each KPI type violates a KPI assurance rule, and performs a rollback operation when a specific value of a KPI of any KPI type violates the KPI assurance rule. An action after the rollback operation is used as the first network parameter adjustment action. In this way, it can ensure that KPI deterioration does not occur in the network parameter optimization process implemented by using the reinforcement learning method.

In a possible embodiment, before the AMF entity sends the KPI type and the KPI assurance threshold of each KPI type, the AMF entity receives information about the KPI assurance rule, and the information about the KPI assurance rule includes the KPI type, the KPI assurance threshold of each KPI type, and content of the rollback operation.

In conclusion, by applying the reinforcement learning method to various data analysis function entities of an access network, real-time online wireless network parameter optimization is implemented, and network performance is optimized. The APF entity feeds back, to the AMF entity, the network parameter optimization action that is actually delivered to the network element, so that the AMF entity can update the evaluation model online, and the various data analysis function entities can implement the online network parameter optimization. According to the method provided in this embodiment, machine learning can be applied to the online wireless network parameter optimization, and an application scope of the machine learning on a wireless network is expanded. Configurations of the rule are orchestrated and sent to the AMF entity, so that the AMF can implement the network parameter optimization based on a parameter that is flexibly configured and that is used in the reinforcement learning method. This resolves a problem that optimization cannot be implemented in a live network because of data shortage caused by fixed network parameter configurations, implements a parameter optimization policy that can be flexibly configured and deployed, and avoids an existing problem that case addition and modification need to be implemented through software and hardware version upgrade when reinforcement learning is applied to the parameter optimization.

According to a second aspect, a network parameter optimization method is provided. Through interaction with another function entity, an MEF entity implements network parameter optimization by using a reinforcement learning method. A network parameter adjustment action is sent to a network element that performs the action, an evaluation model is iteratively updated based on a change of a network environment status after the network element performs the network parameter adjustment action and a return obtained after the network element performs the network parameter adjustment action, and a next network parameter adjustment action is determined by using an evaluation model obtained after update.

In a possible embodiment, the MEF entity receives an evaluation model sent by an AMF entity; the MEF entity determines, based on the evaluation model, a first network parameter adjustment action performed by the network element in a first network environment state, and sends, to an APF entity, information about the first network parameter adjustment action, so that the APF entity sends, to the network element, a first network parameter adjustment action obtained after adjustment, where the first network parameter adjustment action obtained after the adjustment includes the first network parameter adjustment action sent by the MEF entity or a network parameter adjustment action obtained after the APF entity adjusts the first network parameter adjustment action based on a policy; the MEF entity receives an evaluation model that is obtained after update and sent by the AMF entity, where the evaluation model obtained after the update is obtained after the AMF entity updates the evaluation model based on information about the first network environment state, information about the first network parameter adjustment action obtained after the adjustment, information about a return obtained after the network element performs the first network parameter adjustment action obtained after the adjustment, and information about a second network environment state after the network element performs the first network parameter adjustment action obtained after the adjustment; and the MEF entity determines, based on the evaluation model obtained after the update, a second network parameter adjustment action performed by the network element in the second network environment state. In this way, through interaction between the MEF entity and the AMF entity, and further through interaction between the MEF entity and the APF entity and interaction between the APF entity and the network element, the reinforcement learning method can be applied to a network parameter optimization process.

In a possible embodiment, the MEF entity receives a KPI type and a KPI assurance threshold of each KPI type that are sent by the AMF entity; and the MEF entity determines whether a specific value of a KPI of each KPI type violates a KPI assurance rule and sends a determining result to the APF entity, so that the APF entity performs a rollback operation when a specific value of a KPI of any KPI type violates the KPI assurance rule. An action after the rollback operation is used as the first network parameter adjustment action obtained after the adjustment, and the KPI assurance rule is that the specific value is not greater than or not less than the KPI assurance threshold. In this way, it can ensure that KPI deterioration does not occur in the network parameter optimization process implemented by using the reinforcement learning method.

In conclusion, by applying the reinforcement learning method to various data analysis function entities of an access network, real-time online wireless network parameter optimization is implemented, and network performance is optimized. The APF entity feeds back, to the AMF entity, the network parameter optimization action that is actually delivered to the network element, so that the AMF entity can update the evaluation model online, and the various data analysis function entities can implement the online network parameter optimization. According to the method provided in this embodiment, machine learning can be applied to the online wireless network parameter optimization, and an application scope of the machine learning on a wireless network is expanded. Configurations of the rule are orchestrated and sent to the AMF entity, so that the AMF can implement the network parameter optimization based on a parameter that is flexibly configured and that is used in the reinforcement learning method. This resolves a problem that optimization cannot be implemented in a live network because of data shortage caused by fixed network parameter configurations, implements a parameter optimization policy that can be flexibly configured and deployed, and avoids an existing problem that case addition and modification need to be implemented through software and hardware version upgrade when reinforcement learning is applied to the parameter optimization.

According to a third aspect, a network parameter optimization method is provided. Through interaction with another function entity, an APF entity implements network parameter optimization by using a reinforcement learning method. A network parameter adjustment action is sent to a network element that performs the action, an evaluation model is iteratively updated based on a change of a network environment status after the network element performs the network parameter adjustment action and a return obtained after the network element performs the network parameter adjustment action, and a next network parameter adjustment action is determined by using an evaluation model obtained after update.

In a possible embodiment, the APF entity receives a first network parameter adjustment action sent by an MEF entity, where the first network parameter adjustment action is determined by the MEF entity based on an evaluation model; the APF entity delivers, to the network element, a first network parameter adjustment action obtained after adjustment, so that the network element performs, in a first network environment state, the first network parameter adjustment action obtained after the adjustment, and the first network parameter adjustment action obtained after the adjustment includes the first network parameter adjustment action sent by the MEF entity or a network parameter adjustment action obtained after the first network parameter adjustment action is adjusted based on a policy; and the APF entity sends, to an AMF entity, information about the first network parameter adjustment action obtained after the adjustment, so that the AMF entity updates the evaluation model based on information about the first network environment state, the information about the first network parameter adjustment action obtained after the adjustment, information about a return obtained after the network element performs the first network parameter adjustment action obtained after the adjustment, and information about a second network environment state after the network element performs the first network parameter adjustment action obtained after the adjustment. In this way, through interaction between the APF entity and the AMF entity, and further through interaction between the APF entity and the MEF entity and interaction between the APF entity and the network element, the reinforcement learning method can be applied to a network parameter optimization process.

In a possible embodiment, the APF entity further receives information that is about whether a specific value of a KPI violates a KPI assurance rule and sent by the MEF entity; and the APF entity performs a rollback operation when the specific value of the KPI violates the KPI assurance rule. An action after the rollback operation is used as the first network parameter adjustment action obtained after the adjustment. In this way, it can ensure that KPI deterioration does not occur in the network parameter optimization process implemented by using the reinforcement learning method.

In conclusion, by applying the reinforcement learning method to various data analysis function entities of an access network, real-time online wireless network parameter optimization is implemented, and network performance is optimized. The APF entity feeds back, to the AMF entity, the network parameter optimization action that is actually delivered to the network element, so that the AMF entity can update the evaluation model online, and the various data analysis function entities can implement the online network parameter optimization. According to the method provided in this embodiment, machine learning can be applied to the online wireless network parameter optimization, and an application scope of the machine learning on a wireless network is expanded. Configurations of the rule are orchestrated and sent to the AMF entity, so that the AMF can implement the network parameter optimization based on a parameter that is flexibly configured and that is used in the reinforcement learning method. This resolves a problem that optimization cannot be implemented in a live network because of data shortage caused by fixed network parameter configurations, implements a parameter optimization policy that can be flexibly configured and deployed, and avoids an existing problem that case addition and modification need to be implemented through software and hardware version upgrade when reinforcement learning is applied to the parameter optimization.

According to a fourth aspect, a network parameter optimization method is provided. Through interaction with another function entity, an APF entity implements network parameter optimization by using a reinforcement learning method. A network parameter adjustment action is sent to a network element that performs the action, an evaluation model is iteratively updated based on a change of a network environment status after the network element performs the network parameter adjustment action and a return obtained after the network element performs the network parameter adjustment action, and a next network parameter adjustment action is determined by using an evaluation model obtained after update.

In a possible embodiment, the APF entity receives an evaluation model sent by an AMF entity; the APF entity determines, based on the evaluation model, a first network parameter adjustment action performed by the network element in a first network environment state, and sends the first network parameter adjustment action to the network element, so that the network element performs the first network parameter adjustment action in the first network environment state; and the APF entity sends, to the AMF entity, information about the first network parameter adjustment action, so that the AMF entity updates the evaluation model based on information about the first network environment state, the information about the first network parameter adjustment action, information about a return obtained after the network element performs the first network parameter adjustment action, and information about a second network environment state after the network element performs the first network parameter adjustment action. Therefore, the reinforcement learning method is applied to a network parameter optimization process.

In a possible embodiment, the APF entity receives a KPI type and a KPI assurance threshold of each KPI type that are sent by the AMF entity, determines, based on the KPI type and the KPI assurance threshold of each KPI type, whether a specific value of a KPI of each KPI type violates a KPI assurance rule, and performs a rollback operation when a specific value of a KPI of any KPI type violates the KPI assurance rule. An action after the rollback operation is used as the first network parameter adjustment action. In this way, it can ensure that KPI deterioration does not occur in the network parameter optimization process implemented by using the reinforcement learning method.

In conclusion, by applying the reinforcement learning method to various data analysis function entities of an access network, real-time online wireless network parameter optimization is implemented, and network performance is optimized. The APF entity feeds back, to the AMF entity, the network parameter optimization action that is actually delivered to the network element, so that the AMF entity can update the evaluation model online, and the various data analysis function entities can implement the online network parameter optimization. According to the method provided in this embodiment, machine learning can be applied to the online wireless network parameter optimization, and an application scope of the machine learning on a wireless network is expanded. Configurations of the rule are orchestrated and sent to the AMF entity, so that the AMF can implement the network parameter optimization based on a parameter that is flexibly configured and that is used in the reinforcement learning method. This resolves a problem that optimization cannot be implemented in a live network because of data shortage caused by fixed network parameter configurations, implements a parameter optimization policy that can be flexibly configured and deployed, and avoids an existing problem that case addition and modification need to be implemented through software and hardware version upgrade when reinforcement learning is applied to the parameter optimization.

According to a fifth aspect, a network parameter optimization apparatus is provided. The apparatus has a function of implementing any one of the first aspect and the possible embodiments of the first aspect. The function may be implemented by hardware, or may be implemented by hardware executing corresponding software. The hardware or the software includes one or more modules corresponding to the foregoing function.

In a possible embodiment, the apparatus may be a chip or an integrated circuit.

In a possible embodiment, the apparatus includes a transceiver and a processor. The transceiver is used by the apparatus to communicate with another function entity or network element, and the processor is configured to execute a group of programs. When the programs are executed, the apparatus may perform the method according to any one of the first aspect and the possible embodiments of the first aspect.

In a possible embodiment, the apparatus further includes a memory, and the memory stores the programs executed by the processor.

In a possible embodiment, the apparatus is an AMF entity.

According to a sixth aspect, a network parameter optimization apparatus is provided. The apparatus has a function of implementing any one of the second aspect and the possible embodiments of the second aspect. The function may be implemented by hardware, or may be implemented by hardware executing corresponding software. The hardware or the software includes one or more modules corresponding to the foregoing function.

In a possible embodiment, the apparatus may be a chip or an integrated circuit.

In a possible embodiment, the apparatus includes a transceiver and a processor. The transceiver is used by the apparatus to communicate with another function entity or network element, and the processor is configured to execute a group of programs. When the programs are executed, the apparatus may perform the method according to any one of the second aspect and the possible embodiments of the second aspect.

In a possible embodiment, the apparatus further includes a memory, and the memory stores the programs executed by the processor.

In a possible embodiment, the apparatus is an MEF entity.

According to a seventh aspect, a network parameter optimization apparatus is provided. The apparatus has a function of implementing any one of the third aspect and the possible embodiments of the third aspect. The function may be implemented by hardware, or may be implemented by hardware executing corresponding software. The hardware or the software includes one or more modules corresponding to the foregoing function.

In a possible embodiment, the apparatus may be a chip or an integrated circuit.

In a possible embodiment, the apparatus includes a transceiver and a processor. The transceiver is used by the apparatus to communicate with another function entity or network element, and the processor is configured to execute a group of programs. When the programs are executed, the apparatus may perform the method according to any one of the third aspect and the possible embodiments of the third aspect.

In a possible embodiment, the apparatus further includes a memory, and the memory stores the programs executed by the processor.

In a possible embodiment, the apparatus is an APF entity.

According to an eighth aspect, a network parameter optimization apparatus is provided. The apparatus has a function of implementing any one of the fourth aspect and the possible embodiments of the fourth aspect. The function may be implemented by hardware, or may be implemented by hardware executing corresponding software. The hardware or the software includes one or more modules corresponding to the foregoing function.

In a possible embodiment, the apparatus may be a chip or an integrated circuit.

In a possible embodiment, the apparatus includes a transceiver and a processor. The transceiver is used by the apparatus to communicate with another function entity or network element, and the processor is configured to execute a group of programs. When the programs are executed, the apparatus may perform the method according to any one of the fourth aspect and the possible embodiments of the fourth aspect.

In a possible embodiment, the apparatus further includes a memory, and the memory stores the programs executed by the processor.

In a possible embodiment, the apparatus is an APF entity.

According to a ninth aspect, a chip is provided. The chip is connected to a memory or the chip includes the memory, and is configured to read and execute a software program stored in the memory, to implement the method according to any one of the first aspect and the possible embodiments of the first aspect.

According to a tenth aspect, a chip is provided. The chip is connected to a memory or the chip includes the memory, and is configured to read and execute a software program stored in the memory, to implement the method according to any one of the second aspect and the possible embodiments of the second aspect.

According to an eleventh aspect, a chip is provided. The chip is connected to a memory or the chip includes the memory, and is configured to read and execute a software program stored in the memory, to implement the method according to any one of the third aspect and the possible embodiments of the third aspect.

According to a twelfth aspect, a chip is provided. The chip is connected to a memory or the chip includes the memory, and is configured to read and execute a software program stored in the memory, to implement the method according to any one of the fourth aspect and the possible embodiments of the fourth aspect.

According to a thirteenth aspect, a network parameter optimization method is provided. The method includes: sending, by a first function entity, an evaluation model to a second function entity; receiving, by the second function entity, the evaluation model from the first function entity, and determining, based on the evaluation model, a first network parameter adjustment action performed by a network element in a first network environment state; receiving, by the first function entity, information about the first network parameter adjustment action; updating, by the first function entity, the evaluation model based on information about the first network environment state, the information about the first network parameter adjustment action, information about a return obtained after the network element performs the first network parameter adjustment action, and information about a second network environment state after the network element performs the first network parameter adjustment action; and sending, by the first function entity, an evaluation model obtained after update to the second function entity, where the evaluation model obtained after the update is used by the second function entity to determine a second network parameter adjustment action performed by the network element in the second network environment state.

In a possible embodiment, if the first function entity is an AMF entity, and the second function entity is an MEF entity, the sending, by a first function entity, an evaluation model to a second function entity includes: sending, by the AMF entity, the evaluation model to the MEF entity, so that the MEF entity determines, based on the evaluation model, the first network parameter adjustment action that is before adjustment and delivers, to an APF entity, the first network parameter adjustment action that is before the adjustment, and the APF entity delivers, to the network element, a first network parameter adjustment action obtained after the adjustment; and the receiving, by the first function entity, information about the first network parameter adjustment action includes: receiving, by the AMF entity, information about the first network parameter adjustment action that is obtained after the adjustment and sent by the APF entity.

In a possible embodiment, if the first function entity is an AMF entity, and the second function entity is an APF entity, the sending, by a first function entity, an evaluation model to a second function entity, and receiving, by the first function entity, information about the first network parameter adjustment action includes: sending, by the AMF entity, the evaluation model to the APF entity, so that the APF entity determines the first network parameter adjustment action based on the evaluation model; and receiving, by the AMF entity, the information about the first network parameter adjustment action sent by the APF entity.

According to a thirteenth aspect, a communications system is provided. The communications system includes the apparatuses according to at least two of the fifth aspect, the sixth aspect, the seventh aspect, and the eighth aspect.

According to a fourteenth aspect, a computer storage medium is provided. The computer storage medium stores a computer program, and the computer program includes an instruction used to perform the method according to any one of the foregoing aspects and the possible embodiments of the foregoing aspects.

According to a fifteenth aspect, a computer program product including an instruction is provided. When the computer program product is run on a computer, the computer is enabled to perform the method according to any one of the foregoing aspects and the possible embodiments of the foregoing aspects.

DESCRIPTION OF EMBODIMENTS

Figure 1:
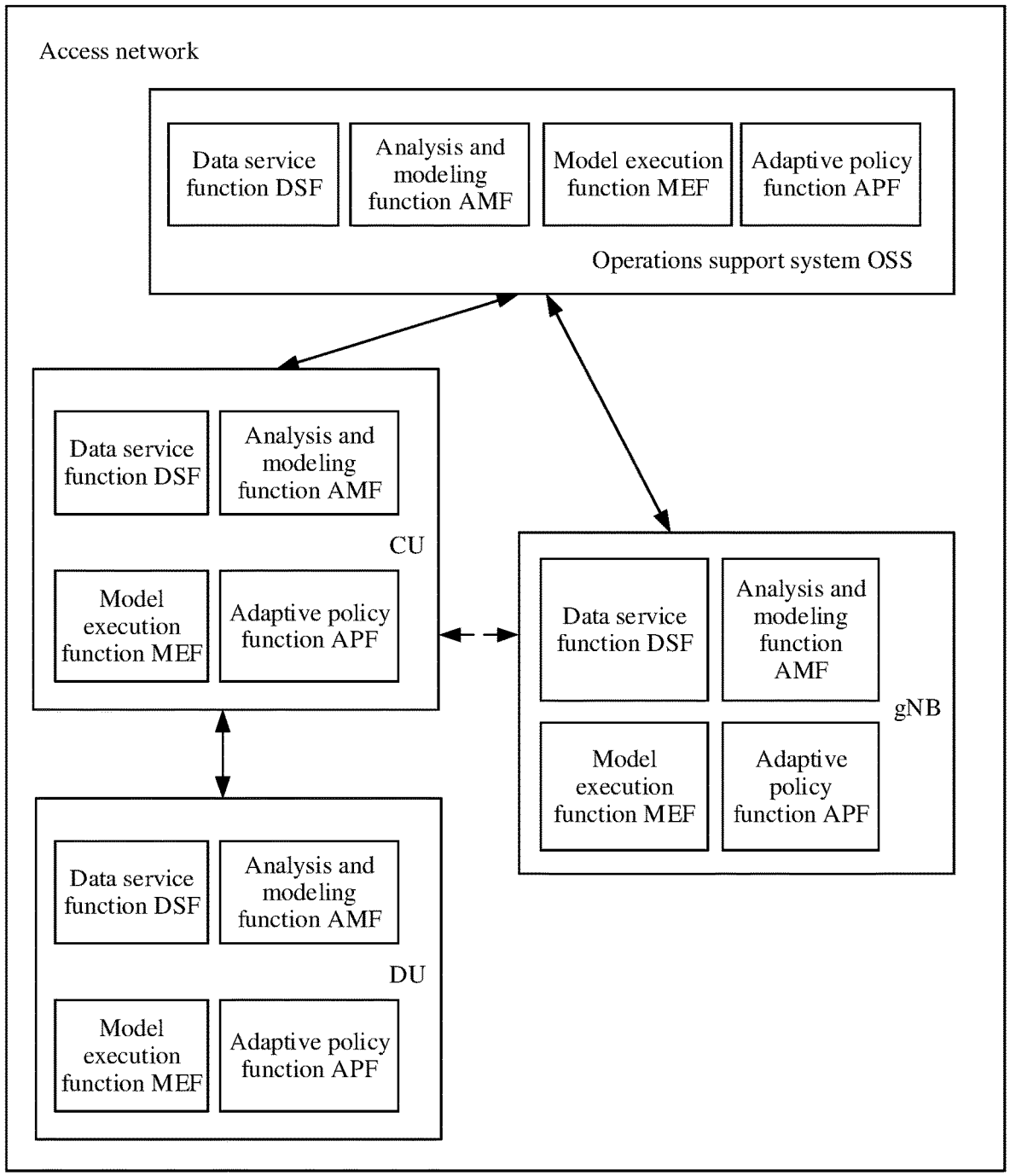
FIG. 1 is a schematic diagram of a system architecture according to an embodiment.

An embodiment provides a network parameter optimization method and apparatus, to implement online network parameter optimization. The method and the apparatus are based on the same inventive concept. Because principles of the method and the apparatus for resolving a problem are similar, mutual reference may be made between implementations of the apparatus and the method, and repeated descriptions are omitted.

The following describes in detail embodiments with reference to accompanying drawings.

The network parameter optimization method provided in the embodiments is applicable to communications systems using different radio access technologies, for example, a 3rd generation 3G communications system, an LTE system, a 5th generation (5G) communications system, and another possible communications system.

An access network is responsible for access of a terminal on a wireless side. Possible deployment modes of an access network device include: separate deployment of a centralized unit and a distributed unit, and deployment of a single site. A single site includes a next generation NodeB/New Radio NodeB (gNB/NR-NB), a transmission reception point, an evolved NodeB (eNB), a radio network controller, a NodeB (NB), a base station controller, a base transceiver station, a home base station (for example, a home evolved NodeB or a home NodeB, HNB), a baseband unit, a wireless fidelity (Wi-Fi) access point (AP), or the like. In a 5G communications system, the single site is the gNB/NR-NB. A centralized unit supports protocols such as a radio resource control (RRC) protocol, a packet data convergence protocol, and a service data adaptation protocol. The centralized unit is usually deployed at a central office and has abundant computing resources. A distributed unit mainly supports a radio link control protocol, a media access control (MAC) protocol, and a physical protocol. The distributed unit is usually deployed in a distributed manner. Usually, one centralized unit is connected to more than one distributed unit. The gNB has functions of the centralized unit and the distributed unit and is usually deployed as a single site. The distributed unit and the gNB usually have limited computing resources due to factors such as limited device sizes and power consumption.

An operations support system (OSS) of the access network is mainly configured to: configure a parameter of a terminal device, and collect information data such as an alarm, performance statistics, a running status, and a log of the terminal device. The terminal device is also be referred to as user equipment (UE), a mobile station, a mobile terminal, or the like, and is a device that provides a user with voice and/or data connectivity. For example, the terminal device includes a handheld device, a vehicle-mounted device, or the like that has a wireless connection function. Currently, the terminal device may be a mobile phone, a tablet, a notebook computer, a palmtop computer, a mobile internet device, a wearable device, a virtual reality (VR) device, an augmented reality (AR) device, a wireless terminal for industrial control, a wireless terminal for self-driving (self-driving), a wireless terminal for a remote medical surgery, a wireless terminal in a smart grid, a wireless terminal in transportation safety, a wireless terminal in a smart city, a wireless terminal in a smart home, or the like.

As shown in FIG. 1, the network parameter optimization method provided in the embodiments is implemented through interaction between four function entities. The four function entities include a data service function (DSF) entity, an AMF entity, an MEF entity, and an APF entity. In the embodiments, through signaling exchange between the four function entities, network parameter optimization is implemented by using a reinforcement learning method. A network parameter adjustment action is sent to a network element that performs the action, an evaluation model is iteratively updated based on a change of a network environment status after the network element performs the network parameter adjustment action and a return obtained after the network element performs the network parameter adjustment action, and a next network parameter adjustment action is determined by using an evaluation model obtained after update.

The following describes functions performed by the foregoing four function entities when the network parameter optimization is implemented.

The DSF is configured to: collect data, pre-process the collected data, provide the AMF with data required for training or updating the evaluation model, and provide the MEF with network data required for executing the evaluation model. In the following descriptions, the network data may also be referred to as data for short.

The AMF is configured to: subscribe to, from the DSF, the data required for training or updating the evaluation model, train or update the evaluation model based on the data that is subscribed to, and send the evaluation model to the MEF. In addition, the AMF is configured to: after receiving the network parameter adjustment action fed back by the APF, iteratively update the evaluation model based on the network parameter adjustment action, and send the evaluation model obtained after the update to the MEF or the APF.

The MEF is configured to: obtain the evaluation model from the AMF, obtain the network data from the DSF, predict the network data online by using the evaluation model, obtain the network parameter adjustment action, and send the network parameter adjustment action to the APF.

The APF is configured to trigger a policy (for example, a conflict processing policy) based on an analysis or prediction result, to change a network status, for example, the APF can implement parameter adjustment, traffic engineering, or resource scheduling. The APF is, for example, configured to: obtain the network parameter adjustment action from the MEF, and send the network parameter adjustment action to the network element that actually performs the network parameter adjustment action, to improve a capacity or performance of the network element. In addition, the APF is configured to feed back the network parameter adjustment action to the AMF.

The foregoing four function entities may be deployed on a network element in an access network, for example, may be deployed on a centralized unit, a distributed unit, a gNB, or an OSS in the access network. For example, the four function entities may be deployed in a same network element, or may be deployed in different network elements in a distributed manner. In other words, in some application scenarios, four function entities in a same network element perform signaling exchange to complete the network parameter optimization method in the embodiments; in some other application scenarios, function entities deployed in different network elements perform signaling exchange by using interfaces between the network elements, to complete the network parameter optimization method in the embodiments. For example, for some parameters with a high requirement for realtime, computing resources of a distributed unit are limited. The evaluation model may be trained or updated by an AMF entity in a centralized unit, and an evaluation model obtained after training or update is executed by an MEF entity in the distributed unit.

It should be noted that names of the foregoing four function entities are not limited. A person skilled in the art may change the names of the foregoing function entities to other names but the entities still perform the same functions. This still falls within the protection scope.

Network parameters in the embodiments may be various parameters in RRM, various parameters in a radio transmission technology, or various parameters in an operation and maintenance system. For example, the network parameters may be: pilot power, reference signal power, an antenna downtilt, an LTE reusable level difference threshold, a measurement report interference decision threshold, and the like.

The following describes in detail the network parameter optimization method provided in the embodiments with reference to the accompanying drawings.

To facilitate understanding of the embodiments, a reinforcement learning method is first described.

Figure 2:
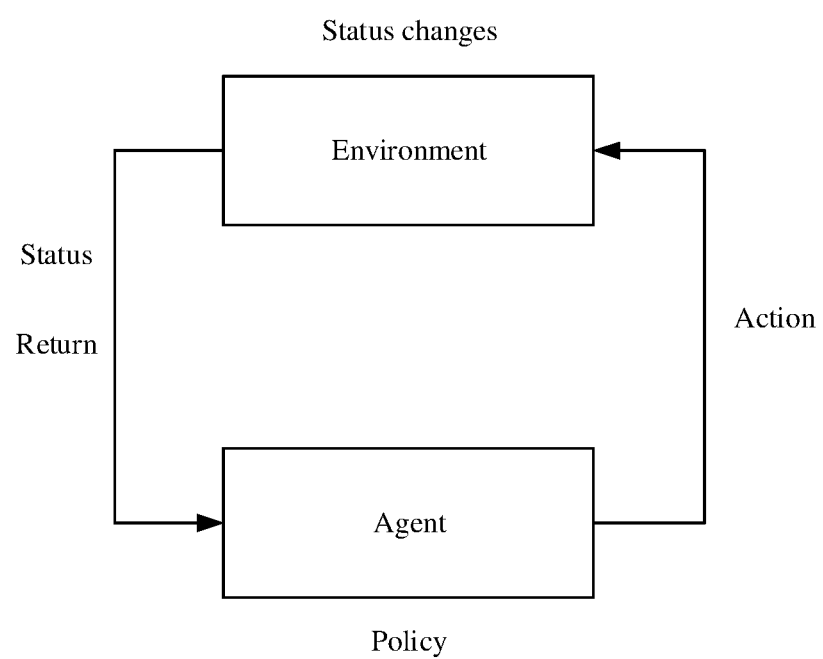
FIG. 2 is a schematic diagram of a reinforcement learning method according to an embodiment.

FIG. 2 is a schematic diagram of a reinforcement learning method. reinforcement learning refers to a process in which an agent takes a series of actions in an environment to obtain a maximum cumulative return. The agent continuously interacts with the environment, and obtains an optimal policy through trial and error. Through the reinforcement learning, the agent can know specific behavior that should be taken in a specific state.

The reinforcement learning process may be represented as a Markov decision process. s is used to represent a state, a is used to represent an action, Q(s, a) is used to represent an estimation of an overall return obtained after the action a is performed in the state s, and r is an immediate return of the action. Q(s, a) may be a table, a functional relationship, or a neural network model.

An initial state of the environment is $s_t$, and the agent selects, in the initial state, an action $a_t$ in A, and performs the action $a_t$. The action $a_t$ is an action that maximizes Q(s, a). After performing the action $a_t$, the agent obtains a return $r_t$, and a status of the environment changes to a next state $s_{t+1}$. The agent updates Q(s, a) based on [$s_{t+1}$, $s_t$, $a_t$, $r_t$]. The agent selects a next action $a_{t+1}$ in the next state $s_{t+1}$, and performs the action $a_{t+1}$. The action $a_{t+1}$ is an action that maximizes Q(s, a) obtained after update. After performing the action $a_{t+1}$, the agent obtains a return $r_{t+1}$, and a status of the environment changes to a next state $S_{t+2}$. The agent continues to iteratively update Q(s, a). The rest may be deduced by analogy.

In the following descriptions, with reference to the reinforcement learning method, an evaluation model may be equivalent to Q(s, a), a network environment status is equivalent to s, and a network parameter adjustment action is equivalent to a.

Figure 3:
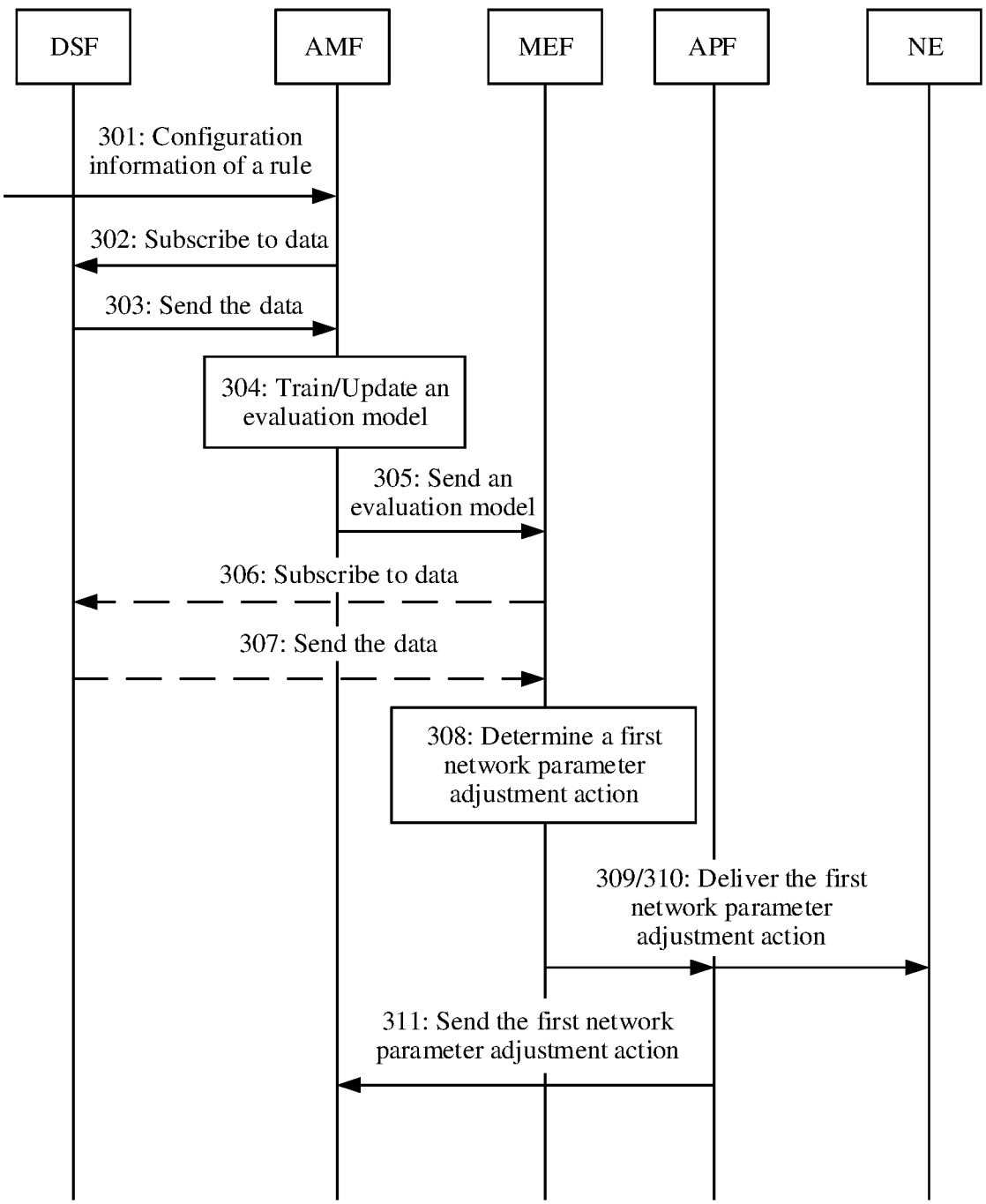
FIG. 3 is a first schematic flowchart of a network parameter optimization method according to an embodiment.

As shown in FIG. 3, a procedure of a network parameter optimization method according to an exemplary embodiment is described as follows.

In step 301, an AMF entity receives configuration information of a reinforcement learning rule.

The reinforcement learning rule may be referred to as a rule for short. The rule includes a type of a network environment status and/or a calculation method of the network environment status, a range of a network parameter adjustment action and a step of the network parameter adjustment action, and a type of a return and/or a calculation method of the return.

For example, a network parameter is pilot power, and the type of the network environment status includes: load of a current cell, a quantity of users, current pilot power, a load difference between a current cell and a neighboring cell, or a reference signal received power (RSRP) distribution/RSRP average variance. The calculation method of the network environment status includes: When the type of the network environment status is the RSRP distribution/RSRP average variance, the calculation method of the network environment status is a calculation manner of the RSRP distribution/RSRP average variance; or when the type of the network environment status is the load difference between the current cell and the neighboring cell, the calculation method of the network environment status is a calculation manner of the load difference between the current cell and the neighboring cell. The range of the network parameter adjustment action is from a minimum value of the pilot power to a maximum value of the pilot power. For example, a range of the pilot power is [MaxTxPower/10−13, MaxTxPower/10−7], and MaxTxPower is a maximum output power. Alternatively, the minimum value of the pilot power is 5% of the maximum output power, and the maximum value of the pilot power is 20% of the maximum output power. The step of the network parameter adjustment action may be 1 dB. For example, a current pilot power is increased by 1 dB or decreased by 1 dB. Assuming that a value, obtained after 1 dB is increased, exceeds the maximum value of the pilot power, the network parameter adjustment action is set to adjust the pilot power to the maximum value of the pilot power. Assuming that a value, obtained after 1 dB is decreased, is less than the minimum value of the pilot power, the network parameter adjustment action is set to adjust the pilot power to the minimum value of the pilot power. The type of the return may be traffic, a user-perceived rate, or spectral efficiency. The calculation method of the return may include: traffic/load; traffic*a KPI, where the KPI may be a circuit switched (circuit switching, CS) call drop rate; or a calculation manner of traffic or load, where for example, the traffic or the load is a weighted sum of traffic or load of a plurality of cells.

The AMF entity sends an evaluation model to an MEF entity, and the MEF entity receives the evaluation model sent by the AMF entity.

The evaluation model may include a correspondence between a network environment status and a network parameter adjustment action. In other words, based on the evaluation model, when a network environment status is known, an optimal network parameter adjustment action may be determined.

In the prior art, a method for applying reinforcement learning to parameter optimization can only be based on software and hardware versions, so that a parameter definition or an algorithm of the reinforcement learning can be improved only when each time a new version is released. The released version cannot be changed within a periodicity, and the parameter definition or the algorithm of the reinforcement learning can be improved again only when a new version is released next time. In this step, by setting an interface on the AMF entity to receive the configuration information of the rule, the parameter definition or the algorithm of the reinforcement learning is flexibly orchestrated, so that data required for training or updating the evaluation model is more abundant and has diversity and applicability, and the rule can be orchestrated based on a network requirement. The rule is the parameter definition or the algorithm of the reinforcement learning.

Step 301 is an optional step.

In step 302, the AMF entity obtains, from a DSF entity, network data required for training the evaluation model.

Optionally, the AMF entity subscribes, from the DSF entity, to the network data required for training the evaluation model, and the DSF entity receives a subscription message of the AMF entity.

For example, the AMF entity determines the type of the network environment status and the type of the return based on the configuration information, of the rule, received in step 301. The AMF entity subscribes, from the DSF entity, to network data of this type of network environment status. The network data may be a specific value of this type of network environment status, or may be source data of this type of network environment status. The AMF calculates, based on the calculation method of the network environment status, the specific value of this type of network environment status by using the source data. For example, the type of the network environment status is a pilot parameter, and the AMF entity subscribes, from the DSF entity, to data of the pilot parameter. For another example, the type of the network environment status is the load difference between the current cell and the neighboring cell. The AMF entity subscribes, from the DSF entity, to load of the current cell and load of the neighboring cell, and then calculates, based on the calculation method of the load difference between the current cell and the neighboring cell, the load difference by using the load of the current cell and the load of the neighboring cell that are obtained through subscription. Similarly, the AMF entity subscribes, from the DSF entity, to network data of this type of return. The network data may be a specific value of this type of return, or may be source data of this type of return. The AMF calculates, based on the calculation method of the return, the specific value of this type of return by using the source data. For example, the type of the return is the traffic, and the AMF entity subscribes, from the DSF entity, to data of the traffic. For another example, the calculation manner of the return is traffic/load, and the AMF entity subscribes, from the DSF entity, to data of the traffic and the load.

In step 303, the DSF entity sends, to the AMF entity, the network data that is subscribed to, and the AMF entity receives the network data sent by the DSF entity.

In step 304, the AMF entity trains the evaluation model based on the network data that is subscribed to.

In step 305, the AMF entity sends an evaluation model to the MEF entity, and the MEF entity receives the evaluation model sent by the AMF entity.

For example, the evaluation model sent by the AMF entity may include the type of the network environment status and/or the calculation method of the network environment status, the range of the network parameter adjustment action and the step of the network parameter adjustment action, and the correspondence between a network environment status and a network parameter adjustment action. Optionally, in this step, the AMF entity may further deliver the specific value, obtained in step 302, of this type of network environment status.

In step 306, the MEF entity subscribes, from the DSF entity, to network data required for executing the evaluation model, and the DSF entity receives a subscription message of the MEF entity.

For example, the MEF entity subscribes, from the DSF entity, to the network data of this type of network environment status based on the type of the network environment status and/or the calculation method of the network environment status that are/is sent by the AMF entity and that are/is received in step 305.

In step 307, the DSF entity sends, to the MEF entity, the network data that is subscribed to, and the MEF entity receives the network data sent by the DSF entity.

It should be noted that, if in step 305, the AMF entity already sends, to the MEF entity, the specific value, obtained in step 302, of this type of network environment status, step 306 and step 307 may be omitted.

In step 308, the MEF entity determines, based on the evaluation model sent by the AMF entity, a first network parameter adjustment action performed by a network element in a first network environment state.

For example, the MEF entity determines, based on the network data obtained in step 307, a specific value of a current network environment state, and denotes the specific value as the first network environment state. Alternatively, a specific value, sent by the AMF entity, of a current network environment state is denoted as the first network environment state. The MEF entity determines, based on the evaluation model sent by the AMF entity, a network parameter adjustment action corresponding to the first network environment state, and denotes the network parameter adjustment action as a first network parameter adjustment action. The first network parameter adjustment action is an action that maximizes the return, and is determined based on the evaluation model. Optionally, the first network parameter adjustment action is to adjust a previous network parameter based on the step of the network parameter adjustment action.

In step 309, the MEF entity delivers, to an APF entity, the first network parameter adjustment action that is before adjustment, and the APF entity receives the first network parameter adjustment action, delivered by the MEF entity, that is before the adjustment.

In step 310, the APF entity delivers, to the network element, a first network parameter adjustment action obtained after the adjustment, and the network element receives and performs the first network parameter adjustment action that is obtained after the adjustment and delivered by the APF entity.

For example, the first network parameter adjustment action that is before the adjustment is determined by the MEF entity based on the evaluation model. The APF entity determines, based on a policy, whether the received first network parameter adjustment action sent by the MEF entity needs to be adjusted, and if the first network parameter adjustment action does not need to be adjusted, the APF entity delivers, to the network element, the first network parameter adjustment action received from the MEF entity; or if the first network parameter adjustment action needs to be adjusted, the APF entity delivers, to the network element, the first network parameter adjustment action obtained after the adjustment. The first network parameter adjustment action obtained after the adjustment is actually a first network parameter adjustment action determined by the APF entity based on the policy; and the first network parameter adjustment action obtained after the adjustment includes an action that is actually adjusted and that is different from the originally received first network parameter adjustment action sent by the MEF entity, or may include an action that is not adjusted and that is the same as the originally received first network parameter adjustment action sent by the MEF entity.

Herein, it should be noted that, in this embodiment, the first network parameter adjustment action sent by the APF to another function entity or the network element is actually the first network parameter adjustment action obtained after the adjustment based on the policy, and certainly, if it is determined, based on the policy, that the first network parameter adjustment action does not need to be adjusted, the first network parameter adjustment action sent by the APF is the first network parameter adjustment action received from the MEF. The description is applicable to the entire embodiment.

After the network element performs the first network parameter adjustment action that is obtained after the adjustment and sent by the APF entity, the network environment status changes, and it is assumed that the network environment status changes to a second network environment state. In addition, after the network element performs the first network parameter adjustment action that is obtained after the adjustment and sent by the APF entity, a return is generated, and it is assumed that the return is denoted as a first return. The DSF may obtain, from the network element, network data of the second network environment state and data of the generated first return, or may obtain the network data of the second network environment state and the data of the generated first return in another manner.

In step 311, the APF entity sends, to the AMF entity, the first network parameter adjustment action obtained after the adjustment, and the AMF entity receives the first network parameter adjustment action that is obtained after the adjustment and sent by the APF entity.

It should be noted that there is no strict execution sequence between step 310 and step 311, and execution sequences may be exchanged.

Steps 302 to 311 continue to be repeatedly performed.

For example, in a process of returning to perform step 302, the AMF entity obtains, from the DSF entity, the data of the second network environment state, and obtains, from the DSF entity, the data of the first return generated after the network element performs the first network parameter adjustment action that is obtained after the adjustment and sent by the APF entity.

In a process of returning to perform step 304, the AMF entity updates the evaluation model based on the second network environment state, the first return, the first network environment state, and the first network parameter adjustment action. The first return is an immediate return obtained after the network element performs the first network parameter adjustment action in the first network environment state. The AMF entity can determine, based on the first return, whether the first network parameter adjustment action performed by the network element brings positive or negative impact on a network environment, and iteratively updates the evaluation model based on the positive or negative impact, so that an evaluation model obtained after update can obtain a maximum overall return, for example, behavior performance of the network element can be maximized, and a network parameter adjustment action performed by the network element can obtain better network efficiency.

In a process of returning to perform step 305, the AMF entity sends, to the MEF entity, the evaluation model obtained after the update, and the MEF entity receives the evaluation model that is obtained after the update and sent by the AMF entity.

In a process of returning to perform step 308, the MEF entity determines, based on the evaluation model that is obtained after the update and sent by the AMF entity, a second network parameter adjustment action performed in the second network environment state.

In a process of returning to perform step 309, the MEF entity delivers the second network parameter adjustment action to the APF entity, and the APF entity receives the second network parameter adjustment action delivered by the MEF entity.

In a process of returning to perform step 310, the APF entity delivers the second network parameter adjustment action to the network element, and the network element receives and performs the second network parameter adjustment action sent by the APF entity.

After the network element performs the second network parameter adjustment action sent by the APF entity, the network environment status changes, and it is assumed that the network environment status changes to a third network environment state. In addition, after the network element performs the second network parameter adjustment action sent by the APF entity, a return is generated, and it is assumed that the return is denoted as a second return. The DSF may obtain, from the network element, network data of the third network environment state and data of the generated second return, or may obtain the network data of the third network environment state and the data of the generated second return in another manner.

In a process of returning to perform step 311, the APF entity sends the second network parameter adjustment action to the AMF entity, and the AMF entity receives the second network parameter adjustment action sent by the APF entity.

Next, operations of steps 302 to 311 continue to be repeatedly performed. In each repeated execution process, the AMF entity iteratively updates the evaluation model, and sends an evaluation model obtained after update to the MEF entity for execution. The MEF determines, based on the evaluation model obtained after the update, a network parameter adjustment action that needs to be performed by the network element. The MEF entity delivers the network parameter adjustment action to the network element via the APF entity, and the MEF entity feeds back the currently performed network parameter adjustment action to the AMF entity, so that the AMF entity iteratively updates the evaluation model.

In conclusion, by applying a reinforcement learning method to various data analysis function entities of an access network, real-time online wireless network parameter optimization is implemented, and network performance is optimized. The APF entity feeds back, to the AMF entity, the network parameter optimization action that is actually delivered to the network element, so that the AMF entity can update the evaluation model online, and the various data analysis function entities can implement the online network parameter optimization. According to the method provided in this embodiment, machine learning can be applied to the online wireless network parameter optimization, and an application scope of the machine learning on a wireless network is expanded. Configurations of the rule are orchestrated and sent to the AMF entity, so that the AMF can implement the network parameter optimization based on a parameter that is flexibly configured and that is used in the reinforcement learning method. This resolves a problem that optimization cannot be implemented in a live network because of data shortage caused by fixed network parameter configurations, implements a parameter optimization policy that can be flexibly configured and deployed, and avoids an existing problem that case addition and modification need to be implemented through software and hardware version upgrade when reinforcement learning is applied to the parameter optimization.

Based on the same inventive concept as the network parameter optimization method shown in FIG. 3, in the embodiments, several other possible implementations of network parameter optimization are proposed through adjustment or modification of some steps. The following describes several other possible implementations.

Figure 4A:
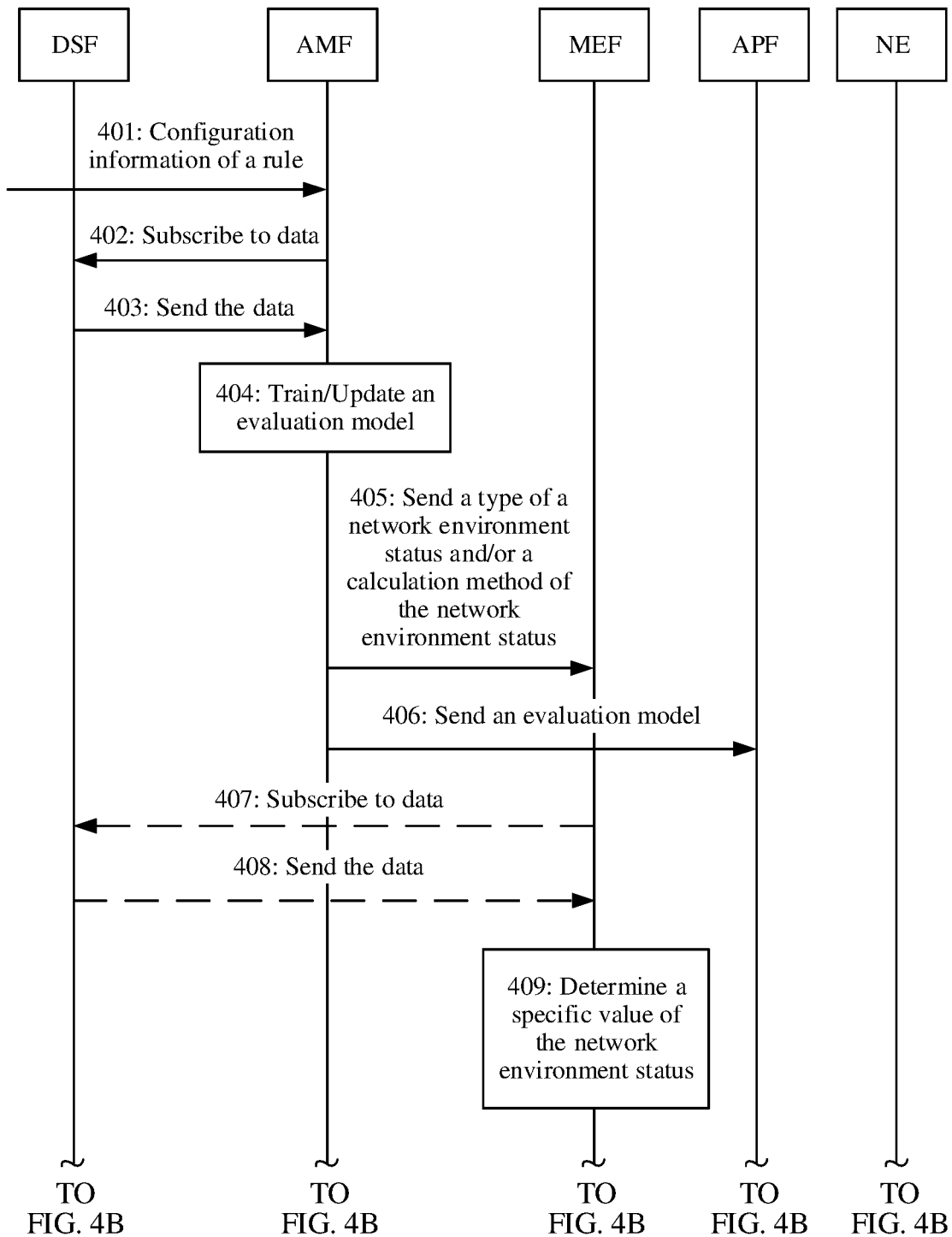
FIG. 4A is a second schematic flowchart of a network parameter optimization method according to an embodiment.
Figure 4B:
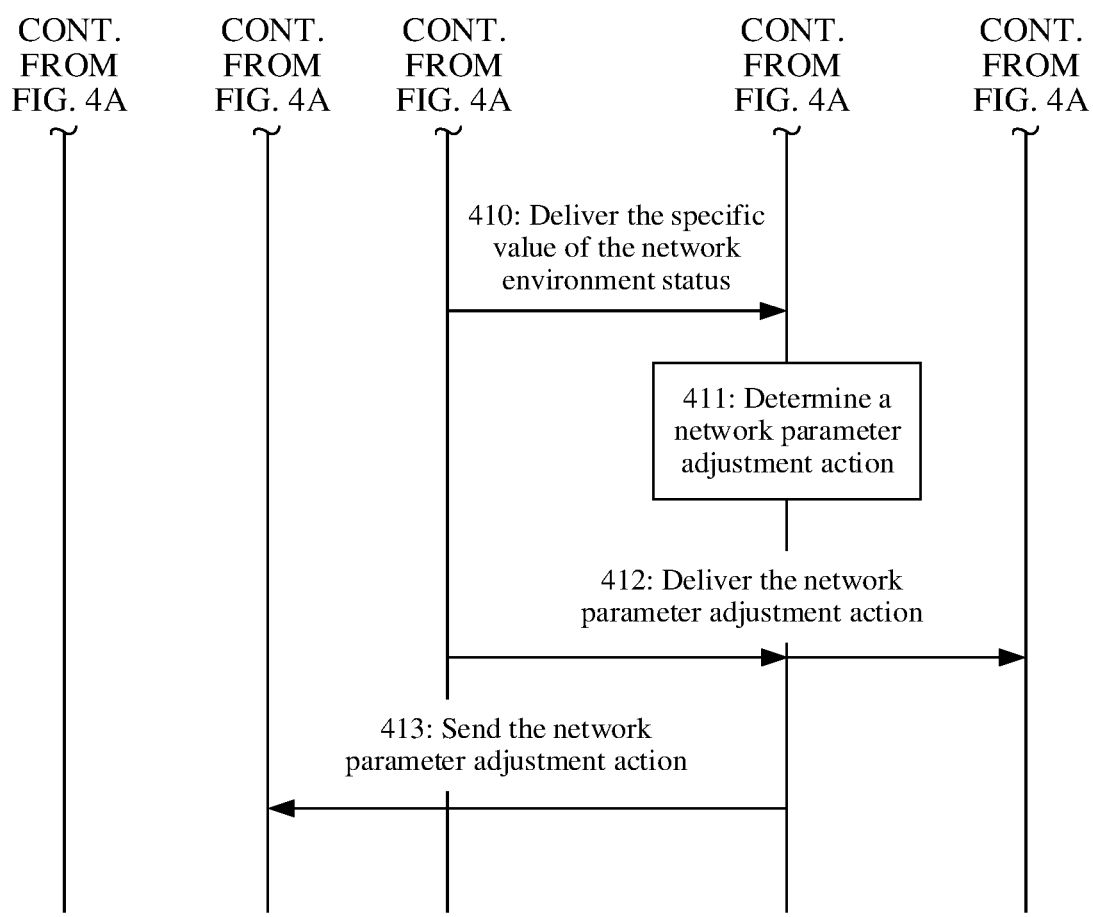
FIG. 4B is a schematic flowchart of a network parameter optimization method according to an embodiment.

As shown in FIG. 4A and FIG. 4B, a procedure of another network parameter optimization method according to an embodiment is described as follows.

Step 401 to step 404 are the same as step 301 to step 304, and repeated descriptions are omitted.

In step 405, an AMF entity sends, to an MEF entity, a type of a network environment status and/or a calculation method of the network environment status, and the MEF entity receives the type of the network environment status and/or the calculation method of the network environment status that are/is sent by the AMF entity. Optionally, in this step, the AMF entity may further deliver a specific value, obtained in step 402, of this type of network environment status.

In step 406, the AMF entity sends an evaluation model to an APF entity, and the APF entity receives the evaluation model sent by the AMF entity.

For example, the evaluation model sent by the AMF entity may include a range of a network parameter adjustment action and a step of the network parameter adjustment action, and a correspondence between a network environment status and a network parameter adjustment action.

In step 407, the MEF entity subscribes, from a DSF entity, to network data required for executing the evaluation model, and the DSF entity receives a subscription message of the MEF entity.

For example, the MEF entity subscribes, from the DSF entity, to network data of this type of network environment status based on the type of the network environment status and/or the calculation method of the network environment status that are/is sent by the AMF entity and that are/is received in step 405.

In step 408, the DSF entity sends, to the MEF entity, the network data that is subscribed to, and the MEF entity receives the network data sent by the DSF entity.

In step 409, the MEF entity determines, based on the network data sent by the DSF entity, the specific value of the network environment status.

It should be noted that, if in step 405, the AMF entity already sends, to the MEF entity, the specific value of the network environment status, step 407 to step 409 may be omitted.

Herein, the specific value, determined by the MEF entity, of the network environment status may be denoted as a first network environment state.

In step 410, the MEF entity sends, to the APF entity, the specific value of the network environment status. Alternatively, a specific value, sent by the AMF entity, of a current network environment state is denoted as the first network environment state.

In step 411, the APF entity determines, based on the specific value of the network environment status and the evaluation model sent by the AMF entity, a first network parameter adjustment action performed by a network element in the first network environment state.

The APF entity determines, based on the evaluation model sent by the AMF entity, a network parameter adjustment action corresponding to the first network environment state, and denotes the network parameter adjustment action as the first network parameter adjustment action. The first network parameter adjustment action is an action that maximizes a return, and is determined based on the evaluation model. Optionally, the first network parameter adjustment action is to adjust a previous network parameter based on a step of the network parameter adjustment action.

In step 412, the APF entity delivers the first network parameter adjustment action to the network element, and the network element receives and performs the first network parameter adjustment action sent by the APF entity.

After the network element performs the first network parameter adjustment action sent by the APF entity, the network environment status changes, and it is assumed that the network environment status changes to a second network environment state. In addition, after the network element performs the first network parameter adjustment action sent by the APF entity, a return is generated, and it is assumed that the return is denoted as a first return. The DSF may obtain, from the network element, network data of the second network environment state and data of the generated first return, or may obtain the network data of the second network environment state and the data of the generated first return in another manner.

In step 413, the APF entity sends the first network parameter adjustment action to the AMF entity, and the AMF entity receives the first network parameter adjustment action sent by the APF entity.

It should be noted that there is no strict execution sequence between step 412 and step 413, and execution sequences may be exchanged.

Steps 402 to 413 continue to be repeatedly performed.

For example, in a process of returning to perform step 402, the AMF entity subscribes, from the DSF entity, to the data of the second network environment state, and subscribes to the data of the first return generated after the network element performs the first network parameter adjustment action sent by the APF entity.

In a process of returning to perform step 404, the AMF entity updates the evaluation model based on the second network environment state, the first return, the first network environment state, and the first network parameter adjustment action. The first return is an immediate return obtained after the network element performs the first network parameter adjustment action in the first network environment state. The AMF entity can determine, based on the first return, whether the first network parameter adjustment action performed by the network element brings positive or negative impact on a network environment, and iteratively updates the evaluation model based on the positive or negative impact, so that an evaluation model obtained after update can obtain a maximum overall return, for example, behavior performance of the network element can be maximized, and a network parameter adjustment action performed by the network element can obtain better network efficiency.

In a process of returning to perform step 405, the AMF entity sends, to the MEF entity, information about the second network environment state.

In a process of returning to perform step 406, the AMF entity sends, to the APF entity, the evaluation model obtained after the update, and the APF entity receives the evaluation model that is obtained after the update and sent by the AMF entity.

In a process of returning to perform step 411, the APF entity determines, based on the evaluation model that is obtained after the update and sent by the AMF entity, a second network parameter adjustment action performed in the second network environment state.

In a process of returning to perform step 412, the APF entity delivers the second network parameter adjustment action to the network element, and the network element receives and performs the second network parameter adjustment action sent by the APF entity.

After the network element performs the second network parameter adjustment action sent by the APF entity, the network environment status changes, and it is assumed that the network environment status changes to a third network environment state. In addition, after the network element performs the second network parameter adjustment action sent by the APF entity, a return is generated, and it is assumed that the return is denoted as a second return. The DSF may obtain, from the network element, network data of the third network environment state and data of the generated second return, or may obtain the network data of the third network environment state and the data of the generated second return in another manner.

In a process of returning to perform step 413, the APF entity sends the second network parameter adjustment action to the AMF entity, and the AMF entity receives the second network parameter adjustment action sent by the APF entity.

Next, operations of steps 402 to 413 continue to be repeatedly performed. In each repeated execution process, the AMF entity iteratively updates the evaluation model, and sends an evaluation model obtained after update to the APF entity for execution. The APF entity determines, based on the evaluation model obtained after the update, a network parameter adjustment action that needs to be performed by the network element. The APF entity delivers the network parameter adjustment action to the network element, and the APF entity feeds back the currently performed network parameter adjustment action to the AMF entity, so that the AMF entity iteratively updates the evaluation model.

In conclusion, in the foregoing implementation, a process of calculating the network environment status and a process of determining the network parameter adjustment action are separated. By applying a reinforcement learning method to various data analysis function entities of an access network, real-time online wireless network parameter optimization is implemented, and network performance is optimized. The APF entity feeds back, to the AMF entity, the network parameter optimization action that is actually delivered to the network element, so that the AMF entity can update the evaluation model online, and the various data analysis function entities can implement the online network parameter optimization. According to the method provided in this embodiment, machine learning can be applied to the online wireless network parameter optimization, and an application scope of the machine learning on a wireless network is expanded. Configurations of the rule are orchestrated and sent to the AMF entity, so that the AMF can implement the network parameter optimization based on a parameter that is flexibly configured and that is used in the reinforcement learning method. This resolves a problem that optimization cannot be implemented in a live network because of data shortage caused by fixed network parameter configurations, implements a parameter optimization policy that can be flexibly configured and deployed, and avoids an existing problem that case addition and modification need to be implemented through software and hardware version upgrade when reinforcement learning is applied to the parameter optimization.

Figure 5A:
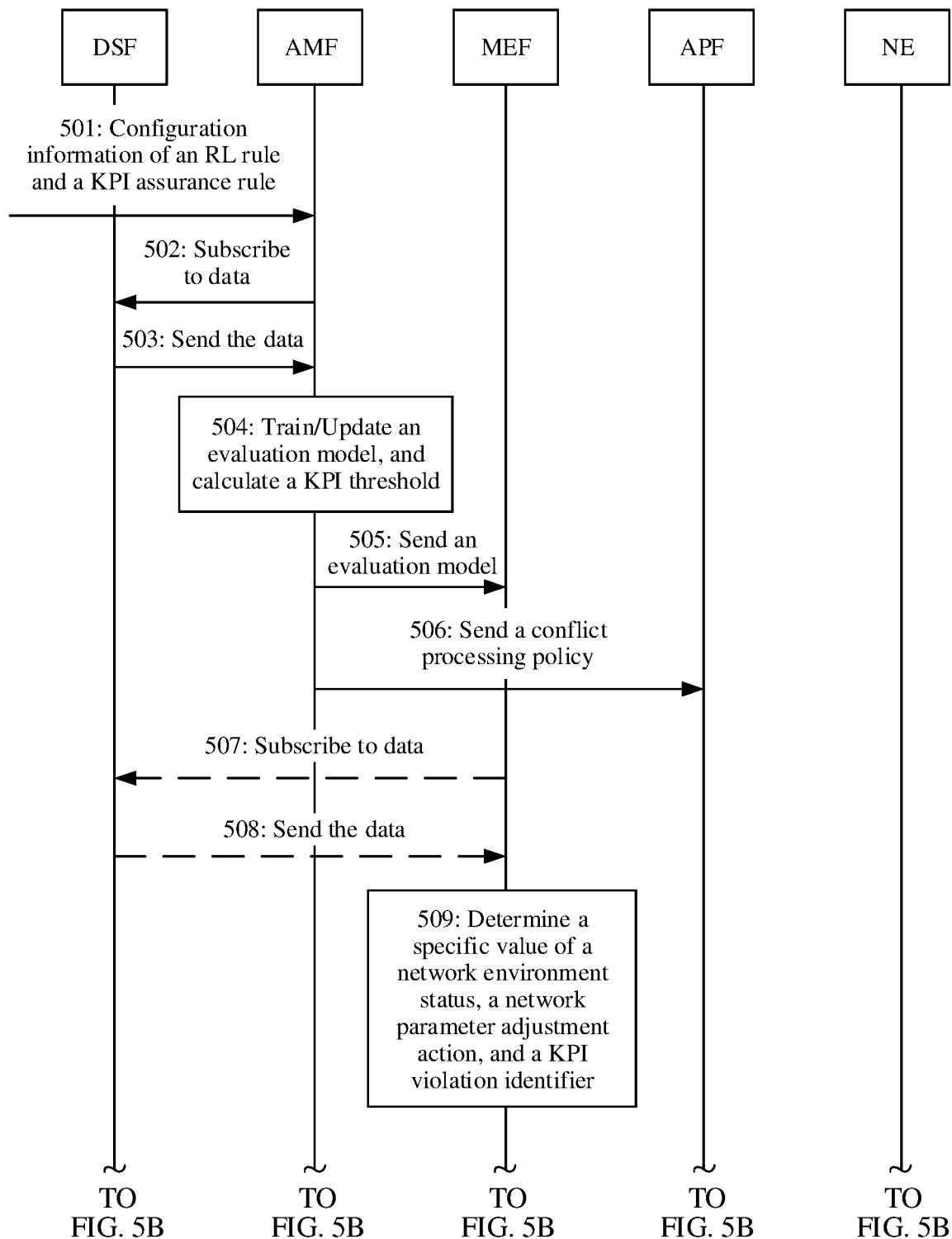
FIG. 5A is a third schematic flowchart of a network parameter optimization method according to an embodiment.
Figure 5B:
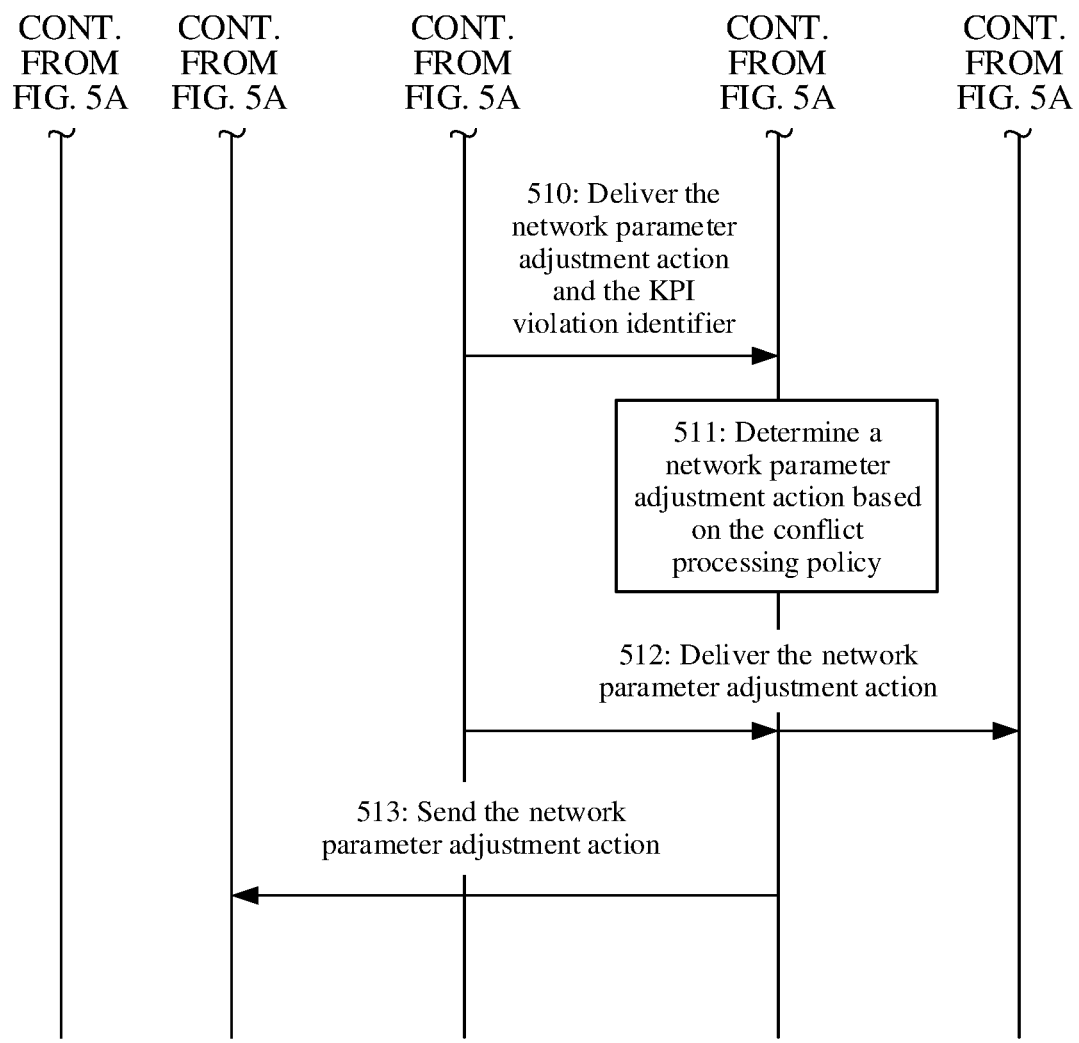
FIG. 5B is a third schematic flowchart of a network parameter optimization method according to an embodiment.

As shown in FIG. 5A and FIG. 5B, a procedure of another network parameter optimization method according to an embodiment is described as follows.

In step 501, an AMF entity receives configuration information of a rule and information about a KPI assurance rule.

Content of the configuration information of the rule is as those described in step 301, and details are not described herein again.

The information about the KPI assurance rule includes a KPI type, a KPI assurance threshold of each KPI type, a KPI assurance rule, content of a rollback operation, and a conflict processing policy. The KPI assurance rule is that a value of a KPI is not greater than or less than the KPI assurance threshold. The rollback operation is performed when a specific value of a KPI of any KPI type violates the KPI assurance rule. The content of the rollback operation is: If the specific value of the KPI violates the KPI assurance rule, a network parameter is adjusted to a default value, or an action opposite to a network parameter adjustment action determined last time based on an evaluation model is performed. The KPI type includes but is not limited to an RRC setup success rate, a packet switched radio access bearer, a CS radio access bearer, a CS call drop rate, a packet switched call drop rate, and adaptive multi rate voice service traffic.

For example, the KPI type is the CS call drop rate, and an assurance threshold of this type of KPI may be 110% or 90% of a historically collected value, or may be 3 σ of historical statistics. For example, the KPI assurance rule is: The CS call drop rate is not greater than 3σ of a distribution over the last month, or the CS call drop rate is not greater than 110% of an average value over the last week, or an RRC setup success rate is not less than 90% of an average value over the last two weeks. The content of the rollback operation is: If the CS call drop rate is greater than 3σ of the distribution over the last month, the rollback operation is performed, for example, a network parameter is adjusted to a default value, or an action opposite to a network parameter adjustment action determined last time based on an evaluation model is performed. The conflict processing policy is used to indicate a specific result that is preferentially executed when a network parameter adjustment action determined based on the evaluation model violates the KPI assurance rule. For example, the conflict processing policy is defined as: when the network parameter adjustment action determined based on the evaluation model is inconsistent with a network parameter adjustment action determined based on the KPI assurance rule, the network parameter adjustment action determined based on the KPI assurance rule is preferentially performed, in other words, when the network parameter adjustment action determined based on the evaluation model violates the KPI assurance rule, the network parameter adjustment action determined based on the evaluation model is ignored or not performed.

In step 502, the AMF entity subscribes, from a DSF entity, to network data required for training the evaluation model and calculating a KPI threshold, and the DSF entity receives a subscription message of the AMF entity.

In step 503, the DSF entity sends, to the AMF entity, the network data that is subscribed to, and the AMF entity receives the network data sent by the DSF entity.

In step 504, the AMF entity trains the evaluation model and calculates the KPI threshold based on the network data that is subscribed to.

Figure 6:
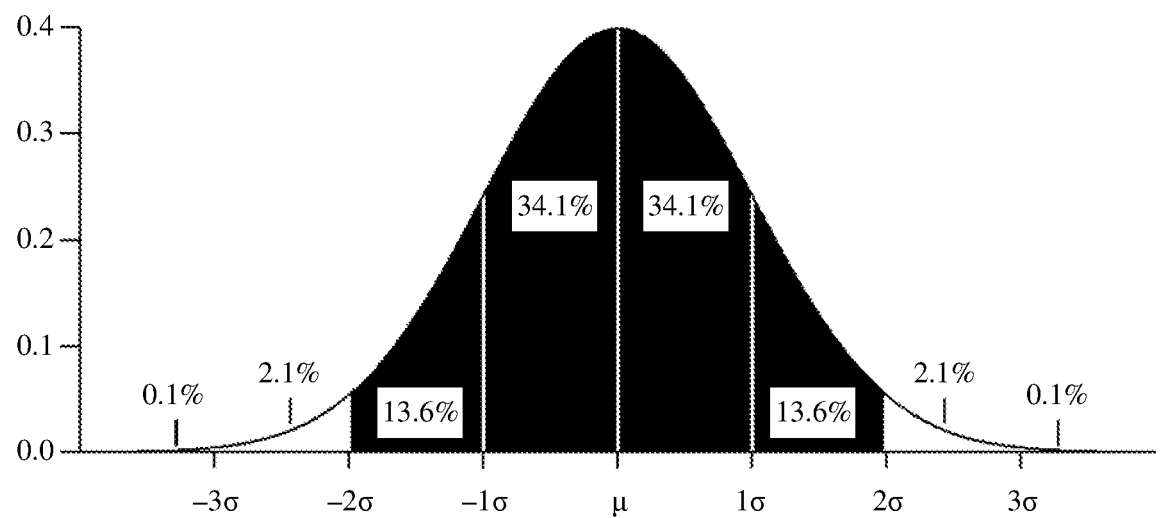
FIG. 6 shows distribution of historically collected CS call drop rates according to an embodiment.

For example, FIG. 6 is CS call drop rate distribution over the last month. If the KPI assurance threshold is 3σ of the CS call drop rate distribution over the last month, the AMF counts an average value and a variance of CS call drop rates and calculates a value of 3σ, and it is assumed that the exemplary value is 0.12%. In other words, a KPI threshold of the CS call drop rate is 0.12%.

In step 505, the AMF entity sends an evaluation model to an MEF entity, and the MEF entity receives the evaluation model sent by the AMF entity.

For example, the evaluation model sent by the AMF entity may include a type of a network environment status and/or a calculation method of the network environment status, a range of a network parameter adjustment action and a step of the network parameter adjustment action, a correspondence between a network environment status and a network parameter adjustment action, and the KPI type and the KPI assurance threshold of each KPI type. Optionally, in this step, the AMF entity may further deliver a specific value of a network environment status of each KPI type and a specific value of a KPI of each KPI type that are obtained in step 502.

In step 506, the AMF entity delivers the conflict processing policy to an APF entity, and the APF entity receives the conflict processing policy sent by the AMF entity.

In step 507, the MEF entity subscribes, from the DSF entity, to network data required for executing the evaluation model, and the DSF entity receives a subscription message of the MEF entity.

For example, the MEF entity subscribes, from the DSF entity, to network data of this type of network environment status based on the type of the network environment status and/or the calculation method of the network environment status that are/is sent by the AMF entity and that are/is received in step 505. In addition, the MEF entity subscribes, from the DSF entity, KPI data of each KPI type based on the KPI type and the KPI assurance threshold of each KPI type that are sent by the AMF entity and that are received in step 505. For example, the KPI data that is subscribed to is a current network CS call drop rate or adaptive multi rate voice service traffic.

In step 508, the DSF entity sends, to the MEF entity, the network data that is subscribed to, and the MEF entity receives the network data sent by the DSF entity.

It should be noted that, if in step 505, the AMF entity already sends, to the MEF entity, the specific value of the network environment status of each KPI type and the specific value of the KPI of each KPI type, step 507 and step 508 may be omitted.

In step 509, the MEF entity determines a network parameter adjustment action based on the evaluation model sent by the AMF entity, and determines whether a specific value of a current KPI violates the KPI assurance rule.

For example, the MEF entity determines, based on the network data sent by the DSF entity, a specific value of a current network environment state, and denotes the specific value as a first network environment state. Alternatively, a specific value, sent by the AMF entity in step 505, of a current network environment state is denoted as the first network environment state. The MEF entity determines, based on the network data sent by the DSF entity in step 508, the specific value of the KPI of each KPI type, or the MEF entity receives the specific value of the KPI of each KPI type sent by the AMF entity. The MEF entity determines, based on the evaluation model sent by the AMF entity, a network parameter adjustment action corresponding to the first network environment state. The MEF entity further determines, for a KPI of any type, whether a specific value of the KPI violates the KPI assurance rule, for example, whether the specific value of the KPI is greater than or less than the KPI threshold. Optionally, the MEF entity may indicate, based on a violation identifier, whether the specific value of the KPI violates the KPI assurance rule. For example, if the specific value of the KPI of any type violates the KPI assurance rule, a KPI violation identifier is recorded as 1; or if the specific value of the KPI does not violate the KPI assurance rule, the KPI violation identifier is recorded as 0.

In step 510, the MEF entity delivers, to the APF entity, the network parameter adjustment action determined based on the evaluation model and a determining result of whether the specific value of the KPI violates the KPI assurance rule, and the APF entity receives the network parameter adjustment action and the determining result that are delivered by the MEF entity.

For example, the determining result may be the KPI violation identifier.

In step 511, the APF entity determines, based on the received conflict processing policy sent by the AMF, a first network parameter adjustment action performed by a network element in the first network environment state.

For example, if the specific value of the KPI of any type violates the KPI assurance rule, the APF entity performs a rollback operation. For example, the network parameter is adjusted to a default value, or the action opposite to the network parameter adjustment action determined last time is performed. An action after the rollback operation is used as the first network parameter adjustment action. If the specific value of the KPI of any type does not violate the KPI assurance rule, the network parameter adjustment action determined based on the evaluation model is used as the first network parameter adjustment action.

In step 512, the APF entity delivers the first network parameter adjustment action to the network element, and the network element receives and performs the first network parameter adjustment action sent by the APF entity.

After the network element performs the first network parameter adjustment action sent by the APF entity, the network environment status changes, and it is assumed that the network environment status changes to a second network environment state. In addition, after the network element performs the first network parameter adjustment action sent by the APF entity, a return is generated, and it is assumed that the return is denoted as a first return. The DSF may obtain, from the network element, network data of the second network environment state and data of the generated first return, or may obtain the network data of the second network environment state and the data of the generated first return in another manner.

In step 513, the APF entity sends the first network parameter adjustment action to the AMF entity, and the AMF entity receives the first network parameter adjustment action sent by the APF entity.

It should be noted that there is no strict execution sequence between step 512 and step 513, and execution sequences may be exchanged.

Steps 502 to 513 continue to be repeatedly performed.

For example, in a process of returning to perform step 502, the AMF entity subscribes, from the DSF entity, to the data of the second network environment state, subscribes to the data of the first return generated after the network element performs the first network parameter adjustment action sent by the APF entity, and subscribes to KPI data obtained after the network element performs the first network parameter adjustment action.

In a process of returning to perform step 504, the AMF entity updates the evaluation model based on the second network environment state, the first return, the first network environment state, and the first network parameter adjustment action. In addition, for a KPI of any type, the AMF entity calculates a KPI threshold and a specific value of the KPI based on KPI data that is subscribed to. The first return is an immediate return obtained after the network element performs the first network parameter adjustment action in the first network environment state. The AMF entity can determine, based on the first return, whether the first network parameter adjustment action performed by the network element brings positive or negative impact on a network environment, and iteratively updates the evaluation model based on the positive or negative impact, so that an evaluation model obtained after update can obtain a maximum overall return, for example, behavior performance of the network element can be maximized, and a network parameter adjustment action performed by the network element can obtain better network efficiency.

In a process of returning to perform step 505, the AMF entity sends, to the MEF entity, the evaluation model obtained after the update and the KPI threshold obtained after recalculation, and the MEF entity receives the evaluation model obtained after the update and the KPI threshold obtained after the recalculation that are sent by the AMF entity.

In a process of returning to step 507 and step 508, for the KPI of any type, the MEF entity obtains, from the DSF entity, the KPI data obtained after the first network parameter adjustment action is performed.

In a process of returning to perform step 509, the MEF entity determines, based on the evaluation model that is obtained after the update and sent by the AMF entity, a network parameter adjustment action performed in the second network environment state. For the KPI of any type, it is determined that whether a specific value of the KPI after the first network parameter adjustment action violates a KPI assurance rule. The KPI assurance rule herein includes the KPI threshold obtained after the recalculation. The specific value of the KPI, obtained by the MEF entity, after the first network parameter adjustment action may be obtained from received information sent by the AMF in the process of returning to step 505, or may be determined by the MEF entity by obtaining the new KPI data in the process of returning to perform step 507 and step 508.

In a process of returning to perform step 510, the MEF entity delivers, to the APF entity, the network parameter adjustment action determined based on the evaluation model obtained after the update and a determining result of whether the specific value of the KPI after the first network parameter adjustment action violates the KPI assurance rule, and the APF entity receives the network parameter adjustment action and the determining result that are delivered by the MEF entity. The determining result is a determining result for the KPI of any type.

In a process of returning to step 511, for the KPI of any type, the APF entity performs, based on the conflict processing policy, a rollback operation when the specific value of the KPI after the first network parameter adjustment action violates the KPI assurance rule, and uses an action after the rollback operation as a second network parameter adjustment action. For the KPI of any type, if the specific value of the KPI after the first network parameter adjustment action does not violate the KPI assurance rule, the network parameter adjustment action, determined based on the evaluation model obtained after the update, is used as the second network parameter adjustment action.

In a process of returning to perform step 512, the APF entity delivers the second network parameter adjustment action to the network element, and the network element receives and performs the second network parameter adjustment action sent by the APF entity.

After the network element performs the second network parameter adjustment action sent by the APF entity, the network environment status changes, and it is assumed that the network environment status changes to a third network environment state. In addition, after the network element performs the second network parameter adjustment action sent by the APF entity, a return is generated, and it is assumed that the return is denoted as a second return. The DSF may obtain, from the network element, network data of the third network environment state and data of the generated second return, or may obtain the network data of the third network environment state and the data of the generated second return in another manner.

In a process of returning to perform step 513, the APF entity sends the second network parameter adjustment action to the AMF entity, and the AMF entity receives the second network parameter adjustment action sent by the APF entity.

Next, operations of steps 502 to 513 continue to be repeatedly performed. In each repeated execution process, the AMF entity iteratively updates the evaluation model, and sends an evaluation model obtained after update to the MEF entity for execution. The MEF determines, based on the evaluation model obtained after the update, a network parameter adjustment action that needs to be performed by the network element. The MEF entity delivers the network parameter adjustment action to the network element via the APF entity, and the MEF entity feeds back the currently performed network parameter adjustment action to the AMF entity, so that the AMF entity iteratively updates the evaluation model. In conclusion, by applying a reinforcement learning method to various data analysis function entities of an access network, real-time online wireless network parameter optimization is implemented, and network performance is optimized. The APF entity feeds back, to the AMF entity, the network parameter optimization action that is actually delivered to the network element, so that the AMF entity can update the evaluation model online, and the various data analysis function entities can implement the online network parameter optimization. According to the method provided in this embodiment, machine learning can be applied to the online wireless network parameter optimization, and an application scope of the machine learning on a wireless network is expanded. Configurations of the rule are orchestrated and sent to the AMF entity, so that the AMF can implement the network parameter optimization based on a parameter that is flexibly configured and that is used in the reinforcement learning method. This resolves a problem that optimization cannot be implemented in a live network because of data shortage caused by fixed network parameter configurations, implements a parameter optimization policy that can be flexibly configured and deployed, and avoids an existing problem that case addition and modification need to be implemented through software and hardware version upgrade when reinforcement learning is applied to the parameter optimization. Further, through a KPI assurance policy, KPI deterioration does not occur in a wireless network parameter optimization process, and a requirement of a wireless network environment on a KPI is ensured.

Based on the concept of the implementation shown in FIG. 5A and FIG. 5B, step 401 in the implementation shown in FIG. 4A may be further optimized as: The AMF entity receives information about a KPI assurance rule. In step 404, the AMF entity further calculates a KPI threshold. In step 405, the AMF entity further delivers a conflict processing policy to the APF entity. In step 411, the APF entity determines, based on the received conflict processing policy sent by the AMF, the first network parameter adjustment action performed by the network element in the first network environment state. For implementation processes of the several steps, refer to step 501, step 504, step 506, and step 511 in FIG. 5A and FIG. 5B. Repeated descriptions are omitted herein.

Figure 7:
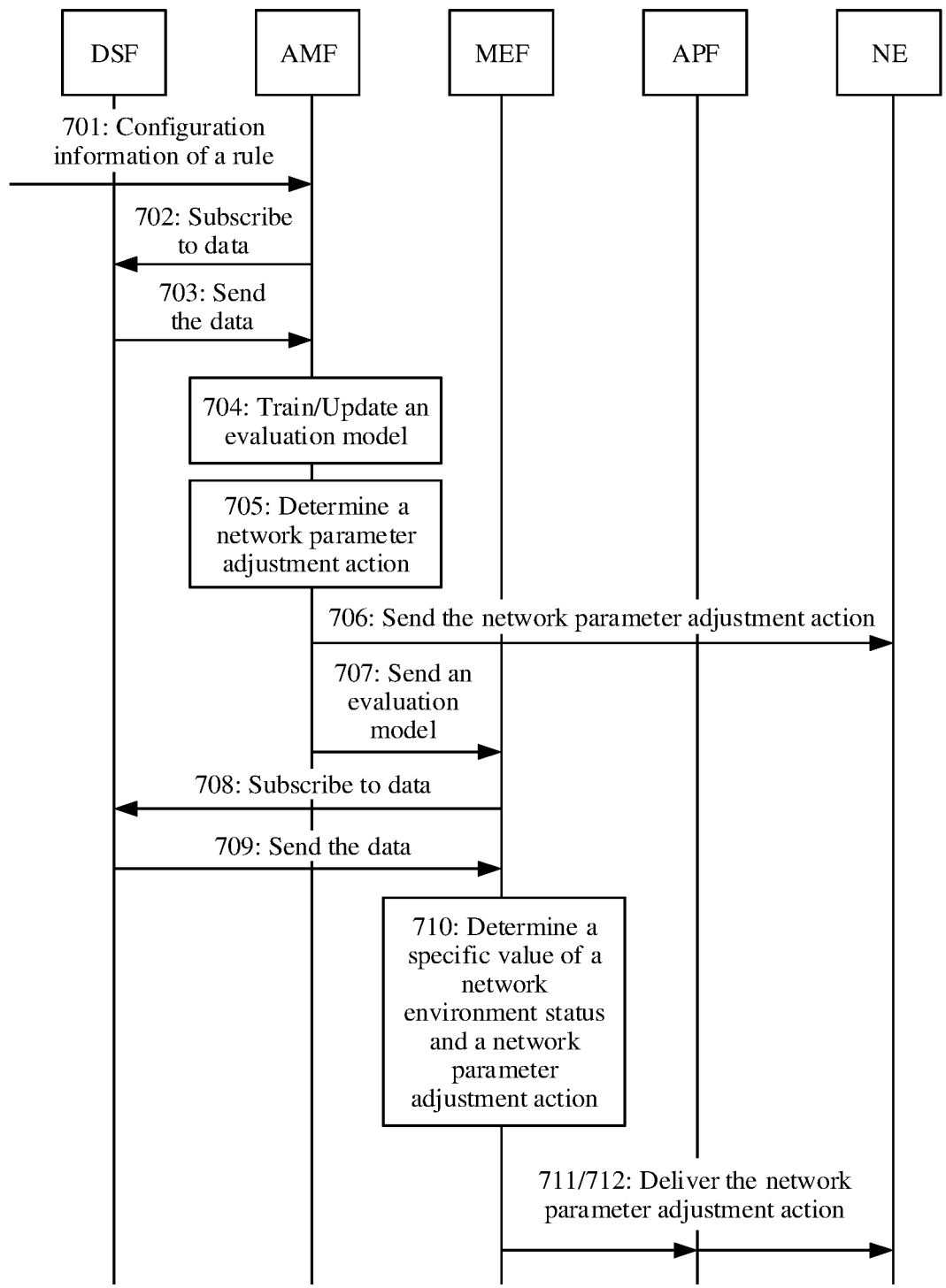
FIG. 7 is a fourth schematic flowchart of a network parameter optimization method according to an embodiment.

As shown in FIG. 7, a procedure of another network parameter optimization method according to an embodiment is described as follows.

Step 701 to step 704 are the same as step 301 to step 304, and details are not described herein again.

In step 705, an AMF entity determines a first network parameter adjustment action performed by a network element in a first network environment state.

In step 706, the AMF entity delivers the first network parameter adjustment action to the network element, and the network element receives and performs the first network parameter adjustment action sent by the AMF entity.

Steps 701 to 706 continue to be repeatedly performed.

In a process of returning to perform step 702, the AMF entity subscribes, from a DSF entity, to data of a second network environment state, and subscribes to data of a first return generated after the network element performs the first network parameter adjustment action sent by an APF entity.

In a process of returning to perform step 704, the AMF entity updates an evaluation model based on the second network environment state, the first return, the first network environment state, and the first network parameter adjustment action. The first return is an immediate return obtained after the network element performs the first network parameter adjustment action in the first network environment state. The AMF entity can determine, based on the first return, whether the first network parameter adjustment action performed by the network element brings positive or negative impact on a network environment, and iteratively updates the evaluation model based on the positive or negative impact, so that an evaluation model obtained after update can obtain a maximum overall return, for example, behavior performance of the network element can be maximized, and a network parameter adjustment action performed by the network element can obtain better network efficiency.

In a process of returning to perform step 705, the AMF entity determines, based on the evaluation model obtained after the update, a second network parameter adjustment action performed in the second network environment state.

In a process of returning to perform step 706, the AMF entity sends the second network parameter adjustment action to the network element, and the network element receives and performs the second network parameter adjustment action sent by the AMF entity.

After the network element performs the second network parameter adjustment action sent by the AMF entity, a network environment status changes, and it is assumed that the network environment status changes to a third network environment state. In addition, after the network element performs the second network parameter adjustment action sent by the AMF entity, a return is generated, and it is assumed that the return is denoted as a second return. The DSF may obtain, from the network element, network data of the third network environment state and data of the generated second return, or may obtain the network data of the third network environment state and the data of the generated second return in another manner.

Next, operations of steps 702 to 706 continue to be repeatedly performed. In each repeated execution process, the AMF entity iteratively updates the evaluation model, and determines, based on an evaluation model obtained after update, a network parameter adjustment action that needs to be performed by the network element.

When a cycle is finished, the AMF obtains an evaluation model obtained after the last update. Next, step 707 and subsequent steps continue to be performed.

For example, the AMF may determine, based on a feedback of the environment, whether the evaluation model is mature, in other words, whether an optimal network parameter can be obtained based on the evaluation model. Therefore, whether to stop performing the cyclic steps is determined.

In step 707, the AMF entity sends, to an MEF entity, the evaluation model obtained after the last update, and the MEF entity receives the evaluation model that is obtained after the last update and sent by the AMF entity.

In step 708, the MEF entity subscribes, from the DSF entity, to network data required for executing the evaluation model obtained after the last update, and the DSF entity receives a subscription message of the MEF entity.

In step 709, the DSF entity sends, to the MEF entity, the network data that is subscribed to, and the MEF entity receives the network data sent by the DSF entity.

In step 710, the MEF entity determines, based on the network data sent by the DSF entity, a specific value of the network environment status, and the MEF entity determines, based on the evaluation model that is obtained after the last update and sent by the AMF entity, a network parameter adjustment action performed by the network element in a current network environment state.

The network parameter adjustment action is determined based on the evaluation model obtained after the last update.

In step 711, the MEF entity delivers the determined network parameter adjustment action to an APF entity, and the APF entity receives the network parameter adjustment action delivered by the MEF entity.

In step 712, the APF entity delivers the network parameter adjustment action to the network element, and the network element receives and performs the network parameter adjustment action sent by the APF entity.

Steps 707 to 712 continue to be repeatedly performed.

In conclusion, by applying a reinforcement learning method to various data analysis function entities of an access network, real-time online wireless network parameter optimization is implemented, and network performance is optimized. According to the method provided in this embodiment, machine learning can be applied to the online wireless network parameter optimization, and an application scope of the machine learning on a wireless network is expanded. Configurations of the rule are orchestrated and sent to the AMF entity, so that the AMF can implement the network parameter optimization based on a parameter that is flexibly configured and that is used in the reinforcement learning method. This resolves a problem that optimization cannot be implemented in a live network because of data shortage caused by fixed network parameter configurations, implements a parameter optimization policy that can be flexibly configured and deployed, and avoids an existing problem that case addition and modification need to be implemented through software and hardware version upgrade when reinforcement learning is applied to the parameter optimization. Further, a cyclic process of steps 702 to 706 may be considered as an evaluation model training process for obtaining an optimal evaluation model, and a process from step 707 to step 711 may be considered as an evaluation model execution process or a prediction process. In this implementation, evaluation model training and prediction are separated. In this implementation, an interface between the AMF entity and the network element is added, so that when the evaluation model training and prediction are separated, a network parameter adjustment action can still be delivered, to implement the online network parameter optimization.

In addition, in the methods shown in FIG. 3 to FIG. 7, in a simple scenario, a process in which the MEF entity delivers the network parameter adjustment action to the network element via the APF entity may be changed to: The MEF entity directly delivers the network parameter adjustment action to the network element without using the APF entity. The foregoing simple scenario may be a scenario in which APF decision is not required, for example, the MEF entity can directly deliver a modulation and coding scheme order selection to the network element. In the methods shown in FIG. 3 to FIG. 7, the DSF entity stores data of various types of network environment statuses, data of various types of returns, and data of various types of KPIs, and the AMF entity and the MEF entity implements functions by subscribing, from the DSF entity, data required for training or executing the evaluation model. To reduce a length of a message used for data communication between function entities, so as to reduce signaling consumption, in this embodiment, different identifiers or index values may be used to distinguish between the types of the foregoing different parameters. The AMF entity and the MEF entity can subscribe to required data only by sending an identifier of a required type of data to the DSF entity, and the DSF entity can determine, based on the received identifier, the data that is subscribed to by the AMF entity and the MEF entity, and feed back the data. For example, for the network environment status, a status index 1 is used to identify types of the network environment status such as pilot power, a quantity of UEs on a cell dedicated channel, and a quantity of instances of handover.

Figure 8:
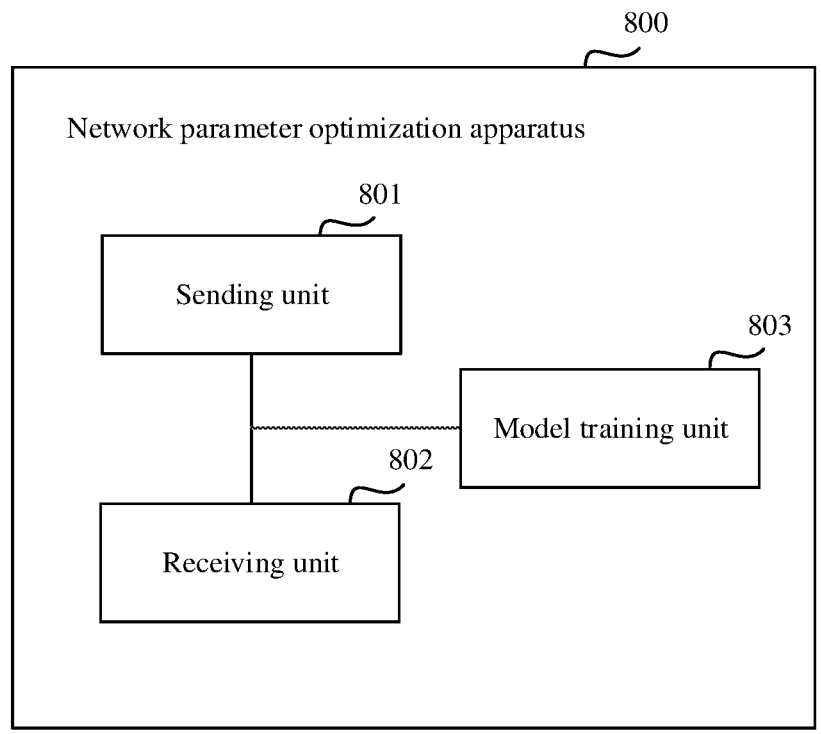
FIG. 8 is a first schematic structural diagram of a network parameter optimization apparatus according to an embodiment.

Based on the same inventive concept as the foregoing network parameter optimization method, as shown in FIG. 8, an embodiment further provides a network parameter optimization apparatus 800. The network parameter optimization apparatus 800 is configured to perform the foregoing network parameter optimization method provided in the embodiments. The network parameter optimization apparatus 800 includes:

a sending unit 801, configured to send an evaluation model to a second function entity, where the evaluation model is used by the second function entity to determine a first network parameter adjustment action performed by a network element in a first network environment state;

a receiving unit 802, configured to receive information about the first network parameter adjustment action; and a model training unit 803, configured to update the evaluation model based on information about the first network environment state, the information about the first network parameter adjustment action, information about a return obtained after the network element performs the first network parameter adjustment action, and information about a second network environment state after the network element performs the first network parameter adjustment action, where the sending unit 801 is further configured to send an evaluation model obtained after update to the second function entity, where the evaluation model obtained after the update is used by the second function entity to determine a second network parameter adjustment action performed by the network element in the second network environment state.

Optionally, the receiving unit 802 is further configured to:

before the model training unit 803 updates the evaluation model, receive configuration information of a rule, where the rule includes at least one of the following: a type and/or a calculation apparatus of a network environment status, a range and a step of a network parameter adjustment action, and a type and/or a calculation apparatus of a return; and the model training unit 803 is further configured to: obtain, based on the rule received by the receiving unit 802, network data of this type of network environment status and of this type of return from a third function entity, and determine, based on the network data, the information about the return obtained after the network element performs the first network parameter adjustment action and the information about the second network environment state.

Optionally, if the apparatus 800 is an AMF entity, and the second function entity is an MEF entity, the sending unit 801 is configured to send the evaluation model to the MEF entity, so that the MEF entity determines, based on the evaluation model, the first network parameter adjustment action that is before adjustment and delivers, to an APF entity, the first network parameter adjustment action that is before the adjustment, and the APF entity delivers, to the network element, a first network parameter adjustment action obtained after the adjustment;

the receiving unit 802 is configured to receive information about the first network parameter adjustment action that is obtained after the adjustment and sent by the APF entity; and the model training unit 803 is configured to update the evaluation model based on the information about the first network environment state, the information about the first network parameter adjustment action obtained after the adjustment, information about a return obtained after the network element performs the first network parameter adjustment action obtained after the adjustment, and information about a second network environment state after the network element performs the first network parameter adjustment action obtained after the adjustment.

Optionally, the sending unit 801 is further configured to:

send, to the MEF entity, a KPI type and a KPI assurance threshold of each KPI type, where the KPI type and the KPI assurance threshold of each KPI type are used for the following operations: The MEF entity determines whether a specific value of a KPI of each KPI type violates a KPI assurance rule and sends a determining result to the APF entity, and the APF entity performs a rollback operation when a specific value of a KPI of any KPI type violates the KPI assurance rule, where an action after the rollback operation is used as the first network parameter adjustment action obtained after the adjustment, and the KPI assurance rule is that the specific value is not greater than or not less than the KPI assurance threshold.

Optionally, if the apparatus 800 is an AMF entity, and the second function entity is an APF entity, the sending unit 801 is configured to send the evaluation model to the APF entity, so that the APF entity determines the first network parameter adjustment action based on the evaluation model; and the receiving unit 802 is configured to receive information about the first network parameter adjustment action sent by the APF entity.

Optionally, the sending unit 801 is further configured to:

send, to the APF entity, a KPI type and a KPI assurance threshold of each KPI type, where the KPI type and the KPI assurance threshold of each KPI type are used for the following operations: The APF entity determines whether a specific value of a KPI of each KPI type violates a KPI assurance rule, and performs a rollback operation when a specific value of a KPI of any KPI type violates the KPI assurance rule, where an action after the rollback operation is used as the first network parameter adjustment action.

Optionally, the receiving unit 802 is further configured to:

before the sending unit 801 sends the KPI type and the KPI assurance threshold of each KPI type, receive information about the KPI assurance rule, where the information about the KPI assurance rule includes the KPI type, the KPI assurance threshold of each KPI type, and content of the rollback operation.

Figure 9:
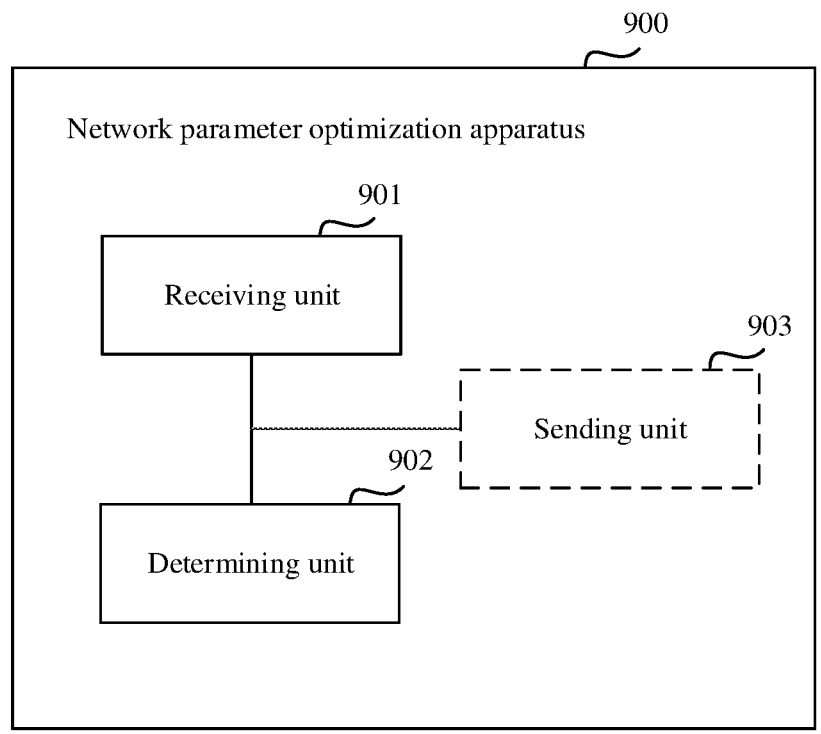
FIG. 9 is a second schematic structural diagram of a network parameter optimization apparatus according to an embodiment.

Based on the same inventive concept as the foregoing network parameter optimization method, as shown in FIG. 9, an embodiment further provides a network parameter optimization apparatus 900. The network parameter optimization apparatus 900 is configured to perform the foregoing network parameter optimization method provided in the embodiments. The network parameter optimization apparatus 900 includes:

a receiving unit 901, configured to receive an evaluation model sent by an AMF entity;

a determining unit 902, configured to determine, based on the evaluation model received by the receiving unit 901, a first network parameter adjustment action performed by a network element in a first network environment state; and a sending unit 903, configured to send, to an APF entity, information about the first network parameter adjustment action, so that the APF entity sends, to the network element, a first network parameter adjustment action obtained after adjustment, where the first network parameter adjustment action obtained after the adjustment includes the first network parameter adjustment action sent by the MEF entity or a network parameter adjustment action obtained after the APF entity adjusts the first network parameter adjustment action based on a policy, where the receiving unit 901 is further configured to receive an evaluation model that is obtained after update and sent by the AMF entity, where the evaluation model obtained after the update is obtained after the AMF entity updates the evaluation model based on information about the first network environment state, information about the first network parameter adjustment action obtained after the adjustment, information about a return obtained after the network element performs the first network parameter adjustment action obtained after the adjustment, and information about a second network environment state after the network element performs the first network parameter adjustment action obtained after the adjustment; and the determining unit 902 is further configured to determine, based on the evaluation model that is obtained after the update and received by the receiving unit 901, a second network parameter adjustment action performed by the network element in the second network environment state.

Optionally, the receiving unit 901 is further configured to receive a KPI type and a KPI assurance threshold of each KPI type that are sent by the AMF entity; and the determining unit 902 is further configured to: determine whether a specific value of a KPI of each KPI type violates a KPI assurance rule, and the sending unit 903 is further configured to send a determining result to the APF entity, so that the APF entity performs a rollback operation when a specific value of a KPI of any KPI type violates the KPI assurance rule, where an action after the rollback operation is used as the first network parameter adjustment action obtained after the adjustment, and the KPI assurance rule is that the specific value is not greater than or not less than the KPI assurance threshold.

Figure 10:
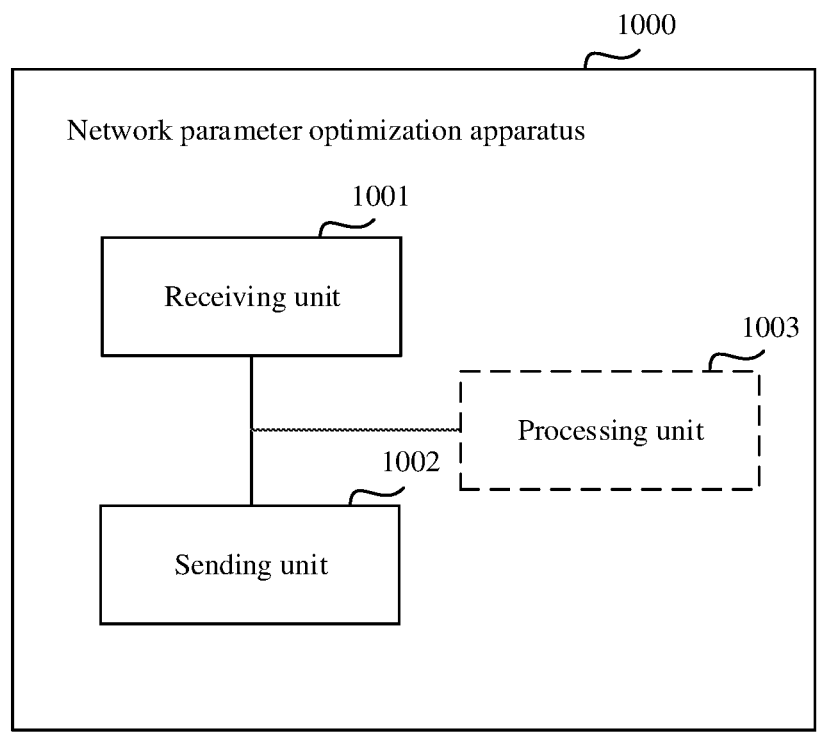
FIG. 10 is a third schematic structural diagram of a network parameter optimization apparatus according to an embodiment.

Based on the same inventive concept as the foregoing network parameter optimization method, as shown in FIG. 10, an embodiment further provides a network parameter optimization apparatus 1000. The network parameter optimization apparatus 1000 is configured to perform the foregoing network parameter optimization method provided in the embodiments. The network parameter optimization apparatus 1000 includes:

a receiving unit 1001, configured to receive a first network parameter adjustment action sent by an MEF entity, where the first network parameter adjustment action is determined by the MEF entity based on an evaluation model; and a sending unit 1002, configured to deliver, to a network element, a first network parameter adjustment action obtained after adjustment, so that the network element performs, in a first network environment state, the first network parameter adjustment action obtained after the adjustment, where the first network parameter adjustment action obtained after the adjustment includes the first network parameter adjustment action sent by the MEF entity or a network parameter adjustment action obtained after the first network parameter adjustment action is adjusted based on a policy; and the sending unit 1002 is further configured to send, to an AMF entity, information about the first network parameter adjustment action obtained after the adjustment, so that the AMF entity updates the evaluation model based on information about the first network environment state, the information about the first network parameter adjustment action obtained after the adjustment, information about a return obtained after the network element performs the first network parameter adjustment action obtained after the adjustment, and information about a second network environment state after the network element performs the first network parameter adjustment action obtained after the adjustment.

Optionally, the receiving unit 1001 is further configured to receive information that is about whether a specific value of a KPI violates a KPI assurance rule and sent by the MEF entity; and the apparatus 1000 further includes a processing unit 1003, and the processing unit 1003 is configured to perform a rollback operation when the specific value of the KPI violates the KPI assurance rule, where an action after the rollback operation is used as the first network parameter adjustment action obtained after the adjustment.

Figure 11:
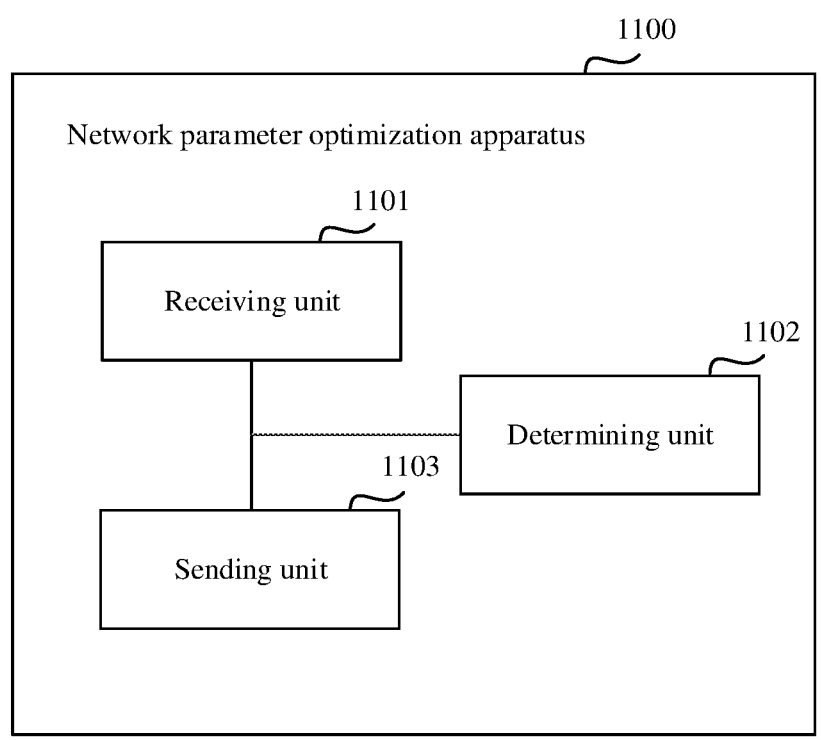
FIG. 11 is a fourth schematic structural diagram of a network parameter optimization apparatus according to an embodiment.

Based on the same inventive concept as the foregoing network parameter optimization method, as shown in FIG. 11, an embodiment further provides a network parameter optimization apparatus 1100. The network parameter optimization apparatus 1100 is configured to perform the foregoing network parameter optimization method provided in the embodiments. The network parameter optimization apparatus 1100 includes:

a receiving unit 1101, configured to receive an evaluation model sent by an AMF entity;

a determining unit 1102, configured to: determine, based on the evaluation model received by the receiving unit 1101, a first network parameter adjustment action performed by a network element in a first network environment state, and send the first network parameter adjustment action to the network element, so that the network element performs the first network parameter adjustment action in the first network environment state; and a sending unit 1103, configured to send, to the AMF entity, information about the first network parameter adjustment action determined by the determining unit 1102, so that the AMF entity updates the evaluation model based on information about the first network environment state, the information about the first network parameter adjustment action, information about a return obtained after the network element performs the first network parameter adjustment action, and information about a second network environment state after the network element performs the first network parameter adjustment action.

Optionally, the receiving unit 1101 is further configured to receive a KPI type and a KPI assurance threshold of each KPI type that are sent by the AMF entity; and the determining unit 1102 is further configured to: determine, based on the KPI type and the KPI assurance threshold of each KPI type that are received by the receiving unit 1101, whether a specific value of a KPI of each KPI type violates a KPI assurance rule, and perform a rollback operation when a specific value of a KPI of any KPI type violates the KPI assurance rule, where an action after the rollback operation is used as the first network parameter adjustment action.

Figure 12:
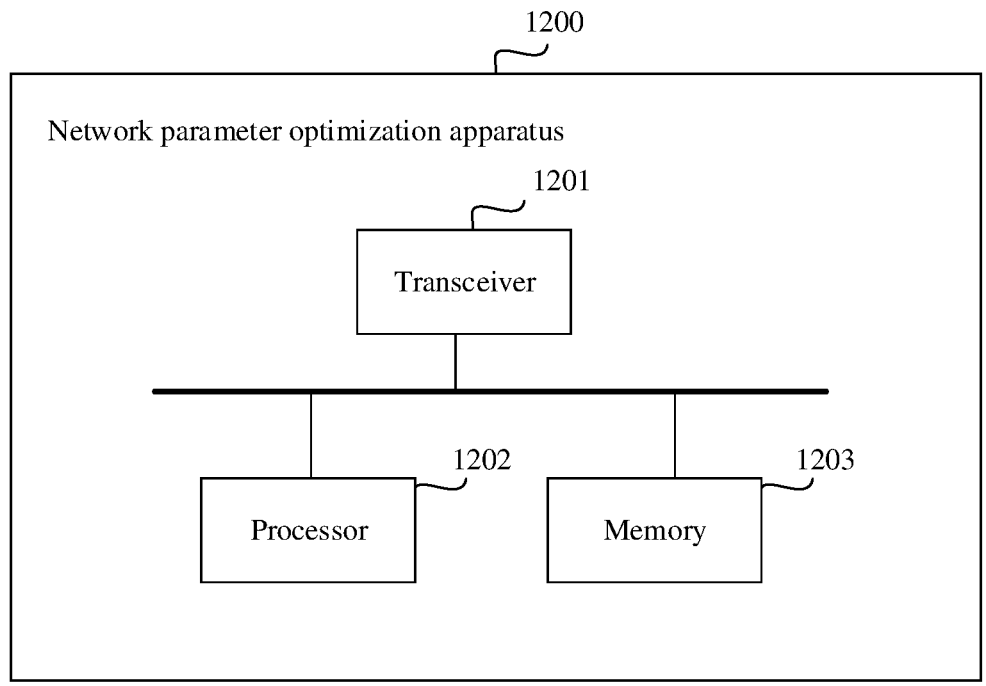
FIG. 12 is a fifth schematic structural diagram of a network parameter optimization apparatus according to an embodiment.

Based on the same inventive concept as the foregoing method embodiments, as shown in FIG. 12, an embodiment further provides a network parameter optimization apparatus 1200. The network parameter optimization apparatus 1200 is configured to perform the foregoing network parameter optimization method. The network parameter optimization apparatus 1200 includes: a transceiver 1201, a processor 1202, and a memory 1203. The memory 1203 is optional. The processor 1202 is configured to invoke a group of programs; and when the programs are executed, the processor 1202 is enabled to perform the foregoing network parameter optimization method. The memory 1203 is configured to store the programs executed by the processor 1202. Function modules in FIG. 8, namely, the sending unit 801 and the receiving unit 802, may be implemented by using the transceiver 1201, and the model training unit 803 may be implemented by using the processor 1202.

The processor 1202 may be a central processing unit (CPU), a network processor, or a combination of the CPU and the network processor.

The processor 1202 may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

The memory 1203 may include a volatile memory, for example, a random access memory (RAM). The memory 1203 may alternatively include a non-volatile memory, for example, a flash memory, a hard disk drive (HDD), or a solid-state drive (SSD). The memory 1203 may alternatively include a combination of the foregoing types of memories.

Figure 13:
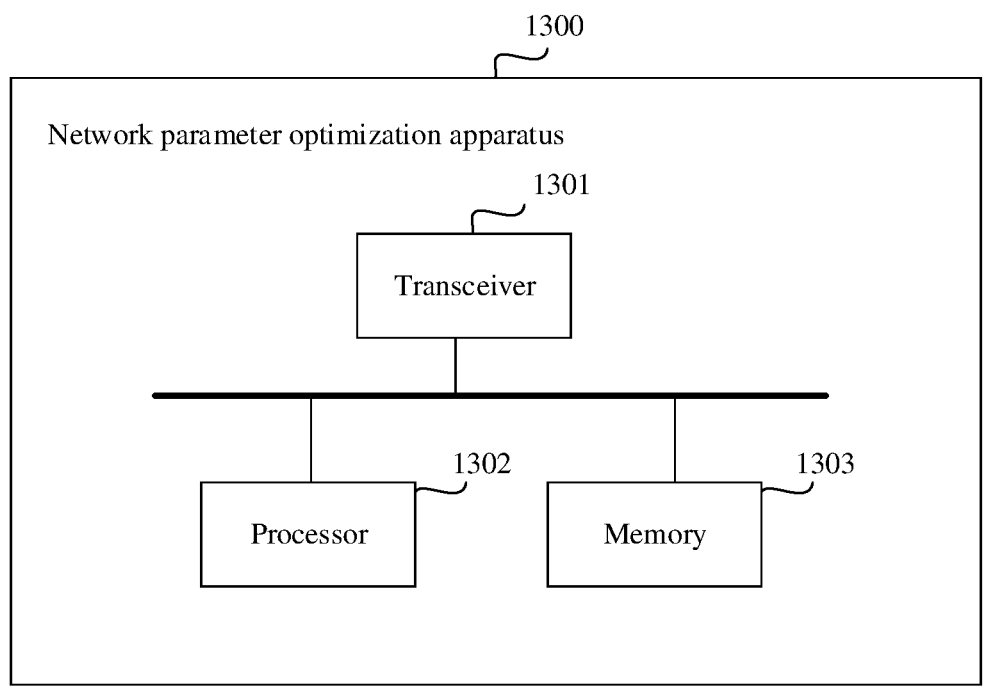
FIG. 13 is a sixth schematic structural diagram of a network parameter optimization apparatus according to an embodiment.

Based on the same inventive concept as the foregoing method embodiments, as shown in FIG. 13, an embodiment further provides a network parameter optimization apparatus 1300. The network parameter optimization apparatus 1300 is configured to perform the foregoing network parameter optimization method. The network parameter optimization apparatus 1300 includes: a transceiver 1301, a processor 1302, and a memory 1303. The memory 1303 is optional. The processor 1302 is configured to invoke a group of programs; and when the programs are executed, the processor 1302 is enabled to perform the foregoing network parameter optimization method. The memory 1303 is configured to store the programs executed by the processor 1302. Function modules in FIG. 9, namely, the receiving unit 901 and the sending unit 903, may be implemented by using the transceiver 1301, and the determining unit 902 may be implemented by using the processor 1302.

The processor 1302 may be a CPU, a network processor, or a combination of the CPU and the network processor.

The processor 1302 may further include a hardware chip. The hardware chip may be an ASIC, a PLD, or a combination thereof. The PLD may be a CPLD, an FPGA, a GAL, or any combination thereof.

The memory 1303 may include a volatile memory, for example, a RAM. The memory 1303 may alternatively include a non-volatile memory, for example, a flash memory, an HDD, or an SSD. The memory 1303 may alternatively include a combination of the foregoing types of memories.

Figure 14:
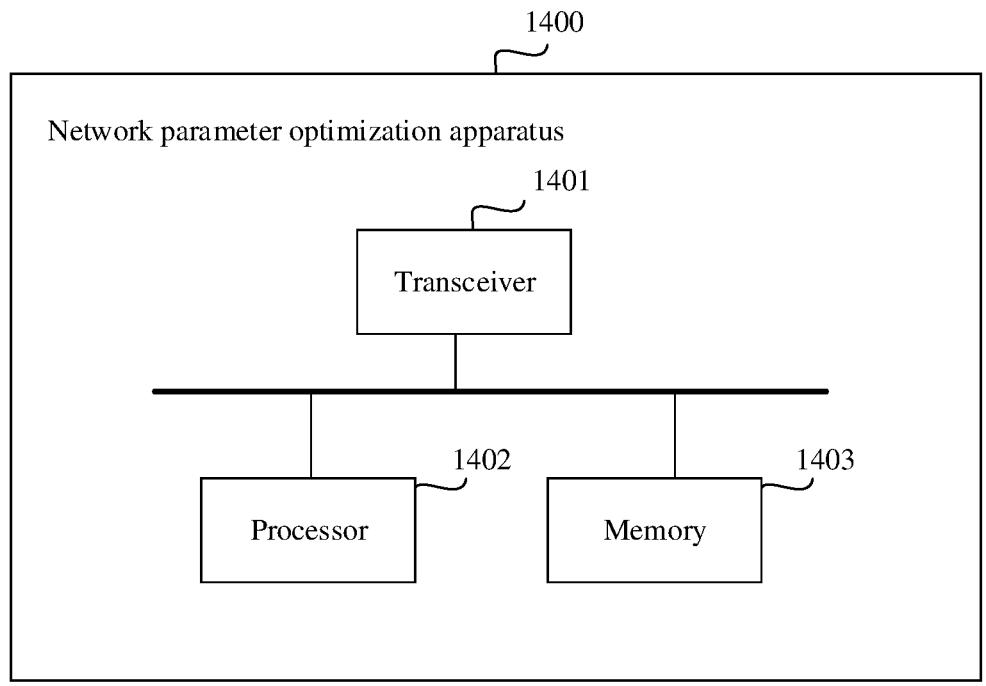
FIG. 14 is a seventh schematic structural diagram of a network parameter optimization apparatus according to an embodiment.

Based on the same inventive concept as the foregoing method embodiments, as shown in FIG. 14, an embodiment further provides a network parameter optimization apparatus 1400. The network parameter optimization apparatus 1400 is configured to perform the foregoing network parameter optimization method. The network parameter optimization apparatus 1400 includes: a transceiver 1401, a processor 1402, and a memory 1403. The memory 1403 is optional. The processor 1402 is configured to invoke a group of programs; and when the programs are executed, the processor 1402 is enabled to perform the foregoing network parameter optimization method. The memory 1403 is configured to store the programs executed by the processor 1402. Function modules in FIG. 10, namely, the receiving unit 1001 and the sending unit 1002, may be implemented by using the transceiver 1401, and the processing unit 1003 may be implemented by using the processor 1402.

The processor 1402 may be a CPU, a network processor, or a combination of the CPU and the network processor.

The processor 1402 may further include a hardware chip. The hardware chip may be an ASIC, a PLD, or a combination thereof. The PLD may be a CPLD, an FPGA, a GAL, or any combination thereof.

The memory 1403 may include a volatile memory, for example, a RAM. The memory 1403 may alternatively include a non-volatile memory, for example, a flash memory, an HDD, or an SSD. The memory 1403 may alternatively include a combination of the foregoing types of memories.

Figure 15:
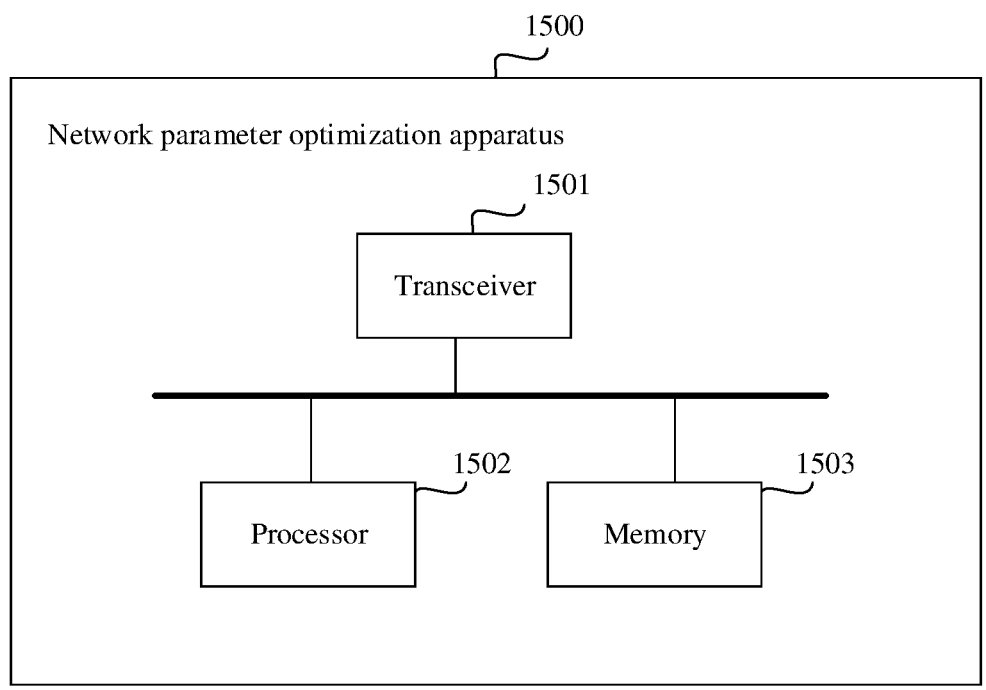
FIG. 15 is an eighth schematic structural diagram of a network parameter optimization apparatus according to an embodiment.

Based on the same inventive concept as the foregoing method embodiments, as shown in FIG. 15, an embodiment further provides a network parameter optimization apparatus 1500. The network parameter optimization apparatus 1500 is configured to perform the foregoing network parameter optimization method. The network parameter optimization apparatus 1500 includes: a transceiver 1501, a processor 1502, and a memory 1503. The memory 1503 is optional. The processor 1502 is configured to invoke a group of programs; and when the programs are executed, the processor 1502 is enabled to perform the foregoing network parameter optimization method. The memory 1503 is configured to store the programs executed by the processor 1502. Function modules in FIG. 11, namely, the receiving unit 1101 and the sending unit 1103, may be implemented by using the transceiver 1501, and the determining unit 1102 may be implemented by using the processor 1502.

The processor 1502 may be a CPU, a network processor, or a combination of the CPU and the network processor.

The processor 1502 may further include a hardware chip. The hardware chip may be an ASIC, a PLD, or a combination thereof. The PLD may be a CPLD, an FPGA, a GAL, or any combination thereof.

The memory 1503 may include a volatile memory, for example, a RAM. The memory 1503 may alternatively include a non-volatile memory, for example, a flash memory, an HDD, or an SSD. The memory 1503 may alternatively include a combination of the foregoing types of memories.

To implement the functions of the apparatus in FIG. 8 or FIG. 12, an embodiment further provides a chip, including a processor, and configured to support the apparatus in implementing the functions related to the first function entity in the foregoing network parameter optimization method. In a possible embodiment, the chip is connected to a memory or the chip includes the memory, and the memory is configured to store a program instruction and data that are necessary to the apparatus.

To implement the functions of the apparatus in FIG. 9 or FIG. 13, an embodiment further provides a chip, including a processor, and configured to support the apparatus in implementing the functions related to the MEF in the foregoing network parameter optimization method. In a possible embodiment, the chip is connected to a memory or the chip includes the memory, and the memory is configured to store a program instruction and data that are necessary to the apparatus.

To implement the functions of the apparatus in FIG. 10 or FIG. 14, an embodiment further provides a chip, including a processor, and configured to support the apparatus in implementing the functions related to the APF entity in the foregoing network parameter optimization method. In a possible embodiment, the chip is connected to a memory or the chip includes the memory, and the memory is configured to store a program instruction and data that are necessary to the apparatus.

To implement the functions of the apparatus in FIG. 11 or FIG. 15, an embodiment further provides a chip, including a processor, and configured to support the apparatus in implementing the functions related to the APF entity in the foregoing network parameter optimization method. In a possible embodiment, the chip is connected to a memory or the chip includes the memory, and the memory is configured to store a program instruction and data that are necessary to the apparatus.

An embodiment provides a computer storage medium. The computer storage medium stores a computer program, and the computer program includes an instruction used to perform the network parameter optimization method.

An embodiment provides a computer program product including an instruction. When the computer program product is run on a computer, the computer is enabled to perform the network parameter optimization method.

A person skilled in the art should understand that the embodiments may be provided as a method, a system, or a computer program product. Therefore, an exemplary embodiment may use a form of hardware only embodiments, software only embodiments, or embodiments with a combination of software and hardware. Moreover, an exemplary embodiment may use a form of a computer program product that is implemented on one or more computer usable storage media (including but not limited to a disk memory, a CD-ROM, an optical memory, and the like) that include computer usable program code.

The embodiments are described with reference to the flowcharts and/or block diagrams of the method, the device (system), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can instruct the computer or another programmable data processing device to work in an exemplary manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or another programmable data processing device, so that a series of operations and steps are performed on the computer or the another programmable device, to generate computer-implemented processing. Therefore, the instructions executed on the computer or the other programmable device provide steps for implementing a specific function in one or more processes in the flowcharts and/or in one or more blocks in the block diagrams.

Although some embodiments have been described, a person skilled in the art can make changes and modifications to these embodiments once they learn the basic inventive concept. Therefore, the following claims are intended to be construed as to cover the embodiments and all changes and modifications falling within the scope.

Clearly, a person skilled in the art can make various modifications and variations to the embodiments without departing from the scope of the embodiments. The embodiments are intended to cover these modifications and variations provided that they fall within the scope of protection defined by the following claims and their equivalent technologies.

What is claimed is:

1. A network parameter optimization method, comprising:
sending, by a first function entity, an evaluation model to a second function entity, wherein the evaluation model is used by the second function entity to determine a first network parameter adjustment action performed by a network element in a first network environment state;
receiving, by the first function entity, information about the first network parameter adjustment action;
updating, by the first function entity, the evaluation model based on information about the first network environment state, the information about the first network parameter adjustment action, information about a return obtained after the network element performs the first network parameter adjustment action, and information about a second network environment state after the network element performs the first network parameter adjustment action; and
sending, by the first function entity, an evaluation model obtained after update to the second function entity, wherein the evaluation model obtained after the update is used by the second function entity to determine a second network parameter adjustment action performed by the network element in the second network environment state,
wherein before the updating, by the first function entity, the evaluation model, the method further comprises:
receiving, by the first function entity, configuration information of a rule, wherein the rule includes at least one of the following: a type and/or a calculation method of a network environment status, a range and a step of a network parameter adjustment action, and a type and/or a calculation method of a return;
obtaining, by the first function entity based on the rule, network data of this type of network environment status and of this type of return from a third function entity; and
determining, by the first function entity based on the network data, the information about the return obtained after the network element performs the first network parameter adjustment action and the information about the second network environment state.

2. The method according to claim 1, wherein if the first function entity is an analysis and modeling function (AMF) entity, and the second function entity is a model execution function (MEF) entity,
the sending, by the first function entity, the evaluation model to the second function entity further comprises:
sending, by the AMF entity, the evaluation model to the MEF entity, so that the MEF entity determines, based on the evaluation model, the first network parameter adjustment action that is before adjustment and delivers, to an adaptive policy function (APF) entity, the first network parameter adjustment action that is before the adjustment, and the APF entity delivers, to the network element, a first network parameter adjustment action obtained after the adjustment;
the receiving, by the first function entity, information about the first network parameter adjustment action further comprises:
receiving, by the AMF entity, information about the first network parameter adjustment action that is obtained after the adjustment and sent by the APF entity; and
the updating, by the first function entity, the evaluation model based on information about the first network environment state, the information about the first network parameter adjustment action, information about a return obtained after the network element performs the first network parameter adjustment action, and information about a second network environment state after the network element performs the first network parameter adjustment action further comprises:
updating, by the first function entity, the evaluation model based on the information about the first network environment state, the information about the first network parameter adjustment action obtained after the adjustment, information about a return obtained after the network element performs the first network parameter adjustment action obtained after the adjustment, and information about a second network environment state after the network element performs the first network parameter adjustment action obtained after the adjustment.

3. The method according to claim 2, wherein the method further comprises:
sending, by the AMF entity to the MEF entity, a key performance indicator (KPI) type and a KPI assurance threshold of each KPI type, wherein the KPI type and the KPI assurance threshold of each KPI type are used for the following operations: the MEF entity determines whether a specific value of a KPI of each KPI type violates a KPI assurance rule and sends a determining result to the APF entity, and the APF entity performs a rollback operation when a specific value of a KPI of any KPI type violates the KPI assurance rule, wherein an action after the rollback operation is used as the first network parameter adjustment action obtained after the adjustment, and the KPI assurance rule is that the specific value is not greater than or not less than the KPI assurance threshold.

4. The method according to claim 1, wherein if the first function entity is an analysis and modeling function (AMF) entity, and the second function entity is an adaptive policy function (APF) entity,
the sending, by the first function entity, the evaluation model to the second function entity, and the receiving, by the first function entity, information about the first network parameter adjustment action further comprise:

sending, by the AMF entity, the evaluation model to the APF entity, so that the APF entity determines the first network parameter adjustment action based on the evaluation model; and receiving, by the AMF entity, the information about the first network parameter adjustment action sent by the APF entity.

5. The method according to claim 4, wherein the method further comprises:
sending, by the AMF entity to the APF entity, a key performance indicator (KPI) type and a KPI assurance threshold of each KPI type, wherein the KPI type and the KPI assurance threshold of each KPI type are used for the following operations: the APF entity determines whether a specific value of a KPI of each KPI type violates a KPI assurance rule, and performs a rollback operation when a specific value of a KPI of any KPI type violates the KPI assurance rule, wherein an action after the rollback operation is used as the first network parameter adjustment action.

6. The method according to claim 3, wherein before the sending, by the AMF entity, the KPI type and the KPI assurance threshold of each KPI type, the method further comprises:
receiving, by the AMF entity, information about the KPI assurance rule, wherein the information about the KPI assurance rule includes the KPI type, the KPI assurance threshold of each KPI type, and content of the rollback operation.

7. A network parameter optimization apparatus, comprising:
a sending unit, configured to send an evaluation model to a second function entity, wherein the evaluation model is used by the second function entity to determine a first network parameter adjustment action performed by a network element in a first network environment state;
a receiving unit, configured to receive information about the first network parameter adjustment action; and
a model training unit, configured to update the evaluation model based on information about the first network environment state, the information about the first network parameter adjustment action, information about a return obtained after the network element performs the first network parameter adjustment action, and information about a second network environment state after the network element performs the first network parameter adjustment action, wherein
the sending unit is further configured to send an evaluation model obtained after update to the second function entity, wherein the evaluation model obtained after the update is used by the second function entity to determine a second network parameter adjustment action performed by the network element in the second network environment state,
wherein the receiving unit is further configured to:
before the model training unit updates the evaluation model, receive configuration information of a rule, wherein the rule includes at least one of the following: a type and/or a calculation apparatus of a network environment status, a range and a step of a network parameter adjustment action, and a type and/or a calculation apparatus of a return; and
the model training unit is further configured to: obtain, based on the rule received by the receiving unit, network data of this type of network environment status and of this type of return from a third function entity, and determine, based on the network data, the information about the return obtained after the network element performs the first network parameter adjustment action and the information about the second network environment state.

8. The apparatus according to claim 7, wherein if the apparatus is an analysis and modeling function (AMF) entity, and the second function entity is a model execution function (MEF) entity,
the sending unit is specifically configured to send the evaluation model to the MEF entity, so that the MEF entity determines, based on the evaluation model, the first network parameter adjustment action that is before adjustment and delivers, to an adaptive policy function (APF) entity, the first network parameter adjustment action that is before the adjustment, and the APF entity delivers, to the network element, a first network parameter adjustment action obtained after the adjustment;
the receiving unit is specifically configured to receive information about the first network parameter adjustment action that is obtained after the adjustment and sent by the APF entity; and
the model training unit is specifically configured to update the evaluation model based on the information about the first network environment state, the information about the first network parameter adjustment action obtained after the adjustment, information about a return obtained after the network element performs the first network parameter adjustment action obtained after the adjustment, and information about a second network environment state after the network element performs the first network parameter adjustment action obtained after the adjustment.

9. The apparatus according to claim 8, wherein the sending unit is further configured to:
send, to the MEF entity, a key performance indicator (KPI) type and a KPI assurance threshold of each KPI type, wherein the KPI type and the KPI assurance threshold of each KPI type are used for the following operations: the MEF entity determines whether a specific value of a KPI of each KPI type violates a KPI assurance rule and sends a determining result to the APF entity, and the APF entity performs a rollback operation when a specific value of a KPI of any KPI type violates the KPI assurance rule, wherein an action after the rollback operation is used as the first network parameter adjustment action obtained after the adjustment, and the KPI assurance rule is that the specific value is not greater than or not less than the KPI assurance threshold.

10. The apparatus according to claim 7, wherein if the apparatus is an analysis and modeling function (AMF) entity, and the second function entity is an adaptive policy function (APF) entity,
the sending unit is specifically configured to send the evaluation model to the APF entity, so that the APF entity determines the first network parameter adjustment action based on the evaluation model; and
the receiving unit is specifically configured to receive information about the first network parameter adjustment action sent by the APF entity.

11. The apparatus according to claim 10, wherein the sending unit is further configured to:
send, to the APF entity, a key performance indicator (KPI) type and a KPI assurance threshold of each KPI type, wherein the KPI type and the KPI assurance threshold of each KPI type are used for the following operations: the APF entity determines whether a specific value of a KPI of each KPI type violates a KPI assurance rule, and performs a rollback operation when a specific value of a KPI of any KPI type violates the KPI assurance rule, wherein an action after the rollback operation is used as the first network parameter adjustment action.

12. The apparatus according to claim 9, wherein the receiving unit is further configured to:

before the sending unit sends the KPI type and the KPI assurance threshold of each KPI type, receive information about the KPI assurance rule, wherein the information about the KPI assurance rule includes the KPI type, the KPI assurance threshold of each KPI type, and content of the rollback operation.

13. A communications system, comprising a first function entity and a second function entity, the first function entity and the second function entity each comprise a processor and a memory, respectively, wherein the first function entity is configured to send an evaluation model to the second function entity;

the second function entity is configured to: receive the evaluation model from the first function entity, and determine, based on the evaluation model, a first network parameter adjustment action performed by a network element in a first network environment state; and the first function entity is further configured to: receive information about the first network parameter adjustment action;

update the evaluation model based on information about the first network environment state, the information about the first network parameter adjustment action, information about a return obtained after the network element performs the first network parameter adjustment action, and information about a second network environment state after the network element performs the first network parameter adjustment action; and send, to the second function entity, an evaluation model obtained after update, wherein the evaluation model obtained after the update is used by the second function entity to determine a second network parameter adjustment action performed by the network element in the second network environment state, wherein the first function entity is further configured to receive configuration information of a rule, wherein the rule includes at least one of the following: a type and/or a calculation method of a network environment status, a range and a step of a network parameter adjustment action, and a type and/or a calculation method of a return;

obtain, based on the rule, network data of this type of network environment status and of this type of return from a third function entity; and determine, based on the network data, the information about the return obtained after the network element performs the first network parameter adjustment action and the information about the second network environment state.

14. The communications system according to claim 13, wherein if the first function entity is an analysis and modeling function (AMF) entity, and the second function entity is a model execution function (MEF) entity, the first function entity is configured to send the evaluation model to the MEF entity, so that the MEF entity determines, based on the evaluation model, the first network parameter adjustment action that is before adjustment, and delivers, to an adaptive policy function (APF) entity, the first network parameter adjustment action that is before the adjustment, and the APF entity delivers, to the network element, a first network parameter adjustment action obtained after the adjustment; and the first function entity is configured to receive information about the first network parameter adjustment action that is obtained after the adjustment and sent by the APF entity.

15. The communications system according to claim 13, wherein if the first function entity is an analysis and modeling function (AMF) entity, and the second function entity is an adaptive policy function APF entity, the first function entity is configured to:

send the evaluation model to the APF entity, so that the APF entity determines the first network parameter adjustment action based on the evaluation model; and receive, by the AMF entity, information about the first network parameter adjustment action sent by the APF entity.

* * * * *